(12) United States Patent
Cho et al.

(10) Patent No.: US 9,706,126 B2
(45) Date of Patent: Jul. 11, 2017

(54) MOBILE TERMINAL AND METHOD OF CONTROLLING DISPLAY OF THE MOBILE TERMINAL BASED ON ACTIVATION OR DEACTIVATION OF FLASH MODE

(71) Applicant: LG ELECTRONICS INC., Seoul (KR)

(72) Inventors: Kyungmin Cho, Seoul (KR); Chansoo Kim, Seoul (KR); Seoyong Park, Seoul (KR); Donggu Shin, Seoul (JE); Jihye Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 14/567,782

(22) Filed: Dec. 11, 2014

(65) Prior Publication Data
US 2015/0201130 A1    Jul. 16, 2015

(30) Foreign Application Priority Data

Jan. 15, 2014  (KR) .......................... 10-2014-0005246

(51) Int. Cl.
*H04N 5/232* (2006.01)
*H04N 5/235* (2006.01)
(Continued)

(52) U.S. Cl.
CPC ..... *H04N 5/23293* (2013.01); *H04N 1/00307* (2013.01); *H04N 5/2354* (2013.01);
(Continued)

(58) Field of Classification Search
None
See application file for complete search history.

(56) References Cited

U.S. PATENT DOCUMENTS

2004/0239799 A1* 12/2004 Suzuki ................ H04N 5/2256
                                                      348/370
2006/0092184 A1*  5/2006 Nam .................. H04N 1/00307
                                                      345/690
(Continued)

FOREIGN PATENT DOCUMENTS

EP        1650706       4/2006
EP        2109295      10/2009
(Continued)

OTHER PUBLICATIONS

European Patent Office Application Serial No. 14004116.1, Search Report dated Jun. 1, 2015, 6 pages.
(Continued)

*Primary Examiner* — Dennis Hogue
(74) *Attorney, Agent, or Firm* — Lee, Hong, Degerman, Kang & Waimey

(57) ABSTRACT

A mobile terminal includes a main body; a front camera disposed at a front side of the main body; a display disposed at the front side of the main body; and a controller configured to control the display such that the display displays a preview image within a first portion of the display, wherein the preview image is obtained via the front camera; displays the preview image within a second portion of the display in response to an input, wherein the first portion includes the second portion and further includes a remaining portion; and displays a second image within the remaining portion of the first portion in response to the input.

12 Claims, 22 Drawing Sheets

(51) Int. Cl.
*H04N 5/262* (2006.01)
*H04N 1/00* (2006.01)
*H04N 21/414* (2011.01)
*H04N 21/422* (2011.01)
*H04N 21/4223* (2011.01)
*H04N 21/443* (2011.01)
*H04N 21/485* (2011.01)
*H04N 5/58* (2006.01)

(52) U.S. Cl.
CPC ..... *H04N 5/23216* (2013.01); *H04N 5/23229* (2013.01); *H04N 5/2628* (2013.01); *H04N 21/41407* (2013.01); *H04N 21/4223* (2013.01); *H04N 21/42202* (2013.01); *H04N 21/4438* (2013.01); *H04N 21/485* (2013.01); *H04M 2250/12* (2013.01); *H04M 2250/52* (2013.01); *H04N 5/58* (2013.01)

(56) References Cited

U.S. PATENT DOCUMENTS

| | | | | |
|---|---|---|---|---|
| 2007/0279427 A1* | 12/2007 | Marks | .............. | H04N 5/2226 345/581 |
| 2009/0115880 A1* | 5/2009 | Wada | ................ | G03B 17/18 348/333.01 |
| 2009/0273661 A1* | 11/2009 | Mauchly | .......... | H04N 5/2256 348/14.08 |
| 2009/0322889 A1* | 12/2009 | Kujawa | ............ | H04N 7/142 348/207.99 |
| 2010/0053342 A1* | 3/2010 | Hwang | ........... | H04N 5/2259 348/207.99 |
| 2010/0118179 A1* | 5/2010 | Ciudad | ............ | H04N 5/2354 348/371 |
| 2010/0194961 A1* | 8/2010 | Patel | ................ | H04N 5/20 348/333.01 |
| 2010/0321467 A1* | 12/2010 | Goodman | ........... | H04N 5/2256 348/14.08 |
| 2011/0035665 A1* | 2/2011 | Kim | ................ | G06F 3/04883 715/702 |
| 2011/0115833 A1 | 5/2011 | Shimoyama | | |
| 2011/0117959 A1* | 5/2011 | Rolston | ............ | A46B 7/04 455/556.1 |
| 2012/0274808 A1* | 11/2012 | Chong | .............. | H04N 5/2258 348/234 |
| 2013/0015946 A1* | 1/2013 | Lau | .................. | G07C 9/00 340/5.2 |
| 2013/0050233 A1* | 2/2013 | Hirsch | .............. | G06F 3/038 345/589 |
| 2013/0148002 A1* | 6/2013 | Kim | ................ | H04N 5/23293 348/333.08 |
| 2013/0314581 A1* | 11/2013 | Kido | ................ | H04N 5/23293 348/333.12 |
| 2014/0293134 A1* | 10/2014 | Hung | ............... | H04N 5/205 348/624 |
| 2015/0002735 A1* | 1/2015 | Moskovchenko | ... | H04N 5/2354 348/370 |
| 2015/0146069 A1* | 5/2015 | Yamazaki | .......... | G06F 1/1637 348/333.01 |
| 2015/0163410 A1* | 6/2015 | Yamazaki | .......... | H04N 5/23293 348/333.11 |

FOREIGN PATENT DOCUMENTS

EP 2667587 11/2013
EP 2667587 A1 * 11/2013 ........... H04N 5/2354

OTHER PUBLICATIONS

European Patent Office Application Serial No. 14004116.1, Search Report dated Sep. 25, 2015, 14 pages.

* cited by examiner

MOBILE TERMINAL AND METHOD OF CONTROLLING DISPLAY OF THE MOBILE TERMINAL BASED ON ACTIVATION OR DEACTIVATION OF FLASH MODE

CROSS-REFERENCE TO RELATED APPLICATIONS

Pursuant to 35 U.S.C. §119(a), this application claims the benefit of earlier filing date and right of priority to Korean Application No. 10-2014-0005246, filed on Jan. 15, 2014, the contents of which are hereby incorporated by reference herein in its entirety.

BACKGROUND OF THE INVENTION

1. Field of the Invention

The present disclosure relates to a mobile terminal and a control method thereof, in which a front camera and a display unit are disposed at the front of a terminal main body.

2. Description of the Conventional Art

A terminal is broadly categorized by mobility into a mobile terminal and a stationary terminal. The mobile terminal is further categorized by portability into a handheld terminal and a vehicle-mounted terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Owing to this improvement, a front camera and a display unit are disposed at the front of a terminal main body, so that a user can conveniently perform a self-photographing function. However, unlike the rear of the terminal main body, a flash is not disposed at the front of the terminal main body due to a problem of safety. This is because the distance between the user and the terminal main body is close in self-photographing, and therefore, the flash may hurt user's eyes. Accordingly, there is a problem in that photographing using the front camera is impossible in a low illumination intensity environment.

SUMMARY OF THE INVENTION

Therefore, an aspect of the detailed description is to provide a mobile terminal and a control method thereof, which performs photographing using a display unit as illumination of a front camera unit.

To achieve these and other advantages and in accordance with the purpose of this specification, as embodied and broadly described herein, a mobile terminal includes: 1. A mobile terminal, comprising: a terminal main body, a front camera disposed at the front of the main body, a display unit disposed at the front of the main body, the display unit displaying a preview image with respect to an image captured by the front camera and a controller configured to control a brightness of at least one area of the display unit so that a brightness of the image captured by the front camera is changed, when a front flash mode with respect to the preview image is executed, wherein the display unit is operated as illumination of the front camera under control of the controller.

In one exemplary embodiment, wherein, when the front flash mode is executed, the controller divides the display unit into first and second areas, displays the preview image in the first area, and displays an preset-color image in the second area.

In one exemplary embodiment, the mobile terminal further comprising an illumination intensity sensor disposed at the front of the main body, the illumination intensity sensor measuring an amount of light incident in the front camera, wherein the sizes of the first and second areas are changed depending on the measured amount of light.

In one exemplary embodiment, wherein the controller changes at least one of the size and position of the first area using a touch input applied to the first area.

In one exemplary embodiment, wherein, when the preview image is displayed in the first area, the controller displays, on the display unit, a graphic object formed to control the size of the first area, and changes the size of the first area based on a drag input applied to the graphic object.

In one exemplary embodiment, wherein a color of the preset-color image is changed depending on a photographing mode of the front camera.

In one exemplary embodiment, wherein the second area is divided into a plurality of areas, and images of different colors are displayed in the plurality of areas, respectively.

In one exemplary embodiment, the mobile terminal further comprising an illumination intensity sensor disposed at the front of the main body, the illumination intensity sensor measuring an amount of light incident in the front camera, wherein the front flash mode is executed when the amount of light incident in the front camera is less than a reference amount of light in a state in which the front camera is activated.

In one exemplary embodiment, the mobile terminal further comprising a light emitting unit disposed at the rear of the display unit, the light emitting unit emitting light in the front direction of the main body, wherein the controller controls the amount of light generated in the light emitting unit so that the amount of light, larger than the reference amount of light, is incident in the front camera.

In one exemplary embodiment, wherein the controller controls the transparency of the preview image so that the light generated in the light emitting unit is directly projected onto a subject.

In one exemplary embodiment, wherein the controller displays the preview image of which transparency is controlled and the preset-color image to be overlapped with each other.

In one exemplary embodiment, wherein, when a photographing command with respect to the preview image is received, the controller gradually changes at least one of the size of an area in which the preview image is displayed and the transparency of the preview image.

In one exemplary embodiment, wherein the controller performs photographing in a state in which a preset-color image is displayed, instead of the preview image, on the display unit in response to the photographing command.

In one exemplary embodiment, wherein, when the front flash mode is executed, the controller outputs notification information for notifying that the front flash mode is executed, using at least one of visual, tactile and auditory manners.

In one exemplary embodiment, the mobile terminal further comprising a rear camera disposed at the rear of the main body, wherein the preview image includes a front image captured by the front camera and a rear image captured by the rear camera.

In one exemplary embodiment, the mobile terminal further comprising a flash disposed at the rear of the main body, the flash being activated when the front flash mode is executed.

To achieve these and other advantages and in accordance with the purpose of this specification, as embodied and broadly described herein, a mobile terminal includes: a terminal main body, a front camera disposed at the front of the main body, a display unit disposed at the front of the main body, the display unit displaying a preview image with respect to an image captured by the front camera; and a controller configured to display an preset-color image, instead of the preview image, so that the brightness of the image captured by the front camera, and perform photographing in the state in which the preset-color image is displayed, when a photographing command with respect to the preview image is received.

In one exemplary embodiment, wherein, when the photographing is completed, the controller again displays the preview image, instead of the preset-color image.

In one exemplary embodiment, wherein the controller extracts a color of a face included in the preview image, and changes the predetermined color based on the extracted color.

To achieve these and other advantages and in accordance with the purpose of this specification, as embodied and broadly described herein, a method for controlling a mobile terminal, the method includes: activating a front camera disposed at the front of a main body, displaying, on a display unit, an image captured by the activated front camera as a preview image, executing a front flash mode so that a brightness of the image captured by the activated front camera is changed, when a predetermined condition is satisfied in the state in which the preview image is displayed on the display unit and controlling the brightness of at least one area of the display unit in response to the execution of the front flash mode.

The mobile terminal and the control method thereof according to the present disclosure have advantages as follows.

According to exemplary embodiments, if the front flash mode is executed, the brightness of at least one area of the display unit, and the display unit performs an illumination function on the front camera. Accordingly, a user can perform self-photographing using light of the display unit in a low illumination intensity environment.

Further, it is possible to provide new-type user convenience in that a graphic user interface capable of using a front display unit as illumination is provided.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF EXEMPLARY EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc.

However, it will be obvious to those skilled in the art that the present invention may be also applicable to a fixed terminal such as a digital TV, a desktop computer and a digital signage, except for specific configurations for mobility.

Figure 1A:
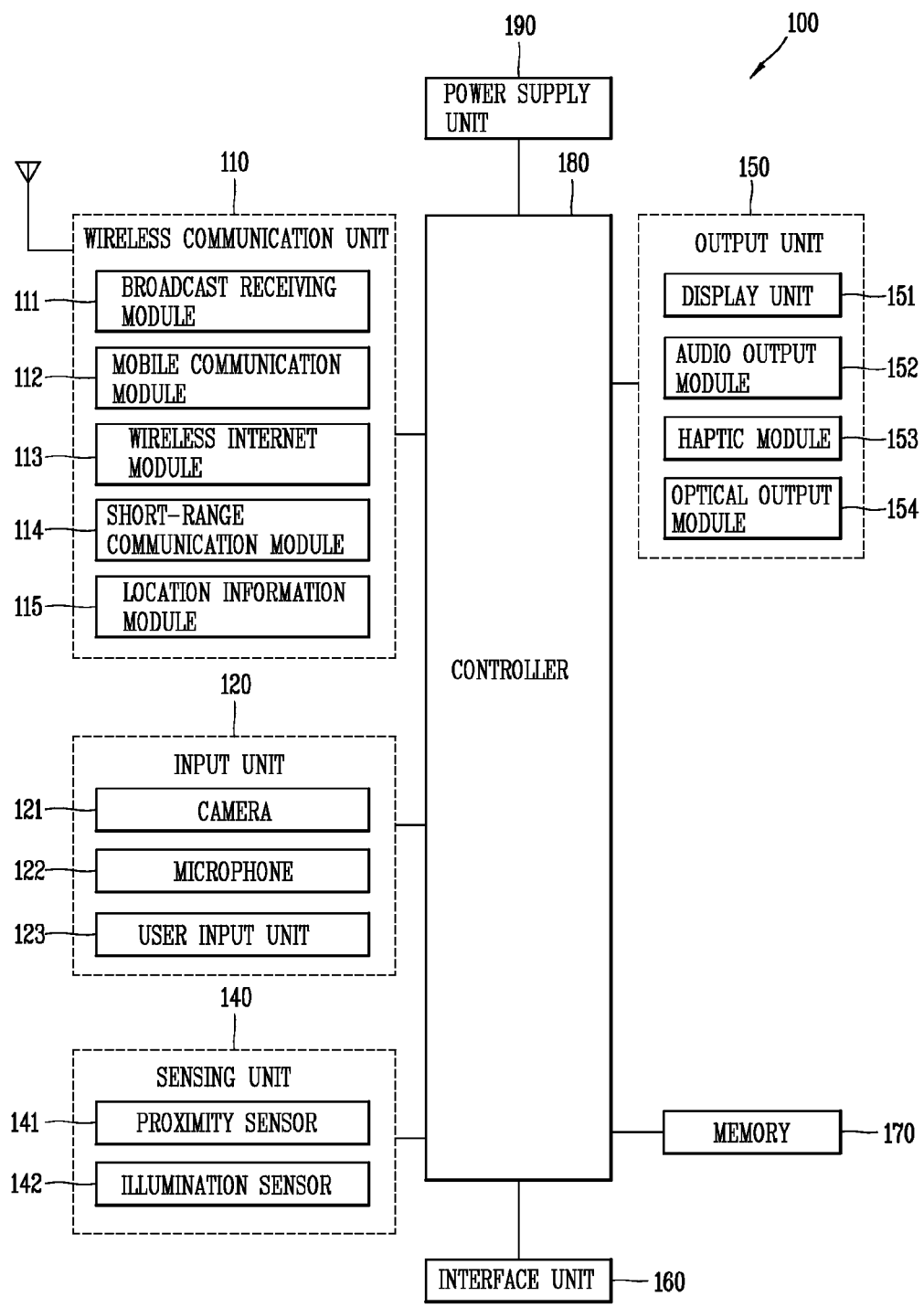
FIG. 1A is a block diagram illustrating a mobile terminal according to an exemplary embodiment.
Figure 1B:
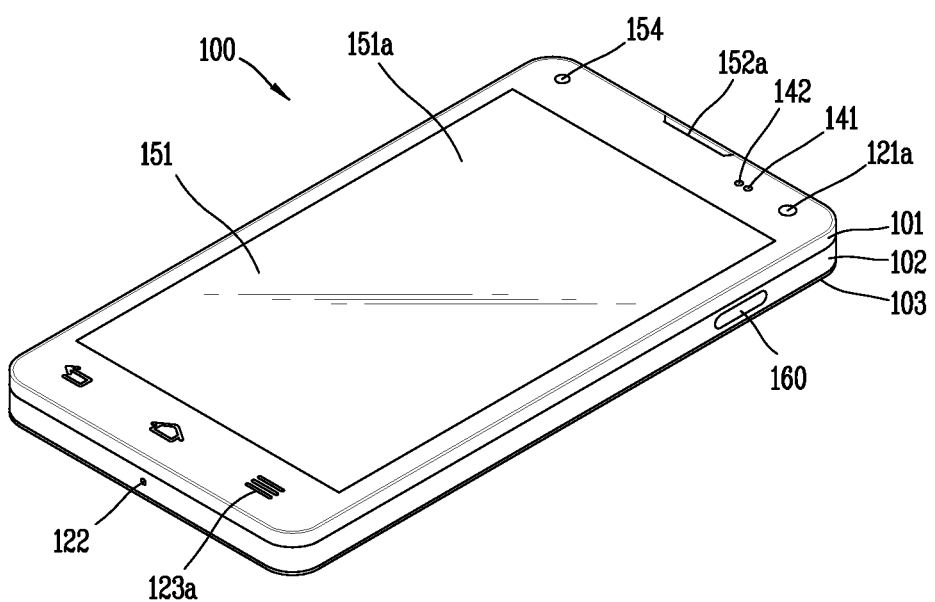
FIGS. 1B and 1C are conceptual diagrams illustrating an example of the mobile terminal viewed in different directions according to the exemplary embodiment.
Figure 1C:
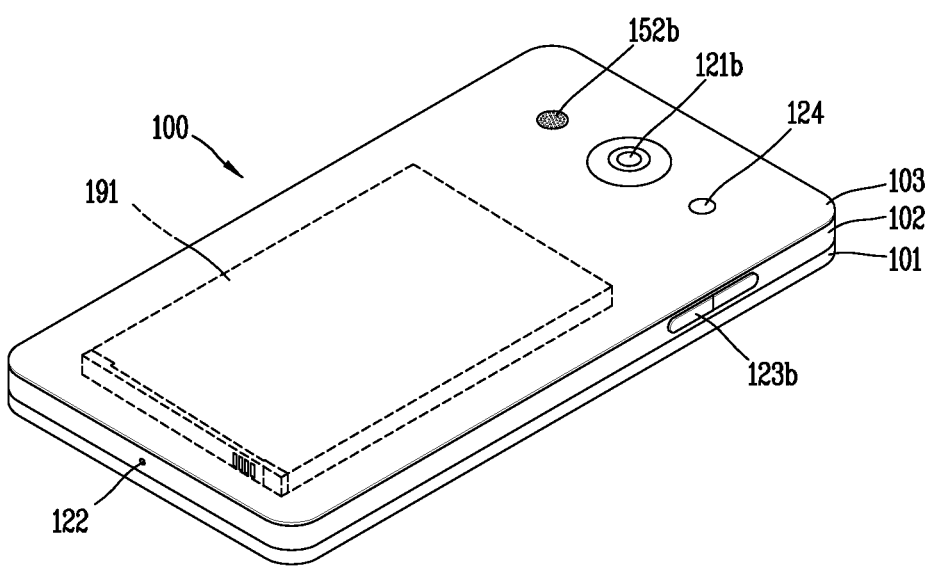

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, a communication system which is operable with the mobile terminal 100 according to the present disclosure will be described.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

A CDMA wireless communication system is shown having a plurality of mobile terminals 100, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 (FIG. 1A) is typically configured inside the mobile terminal 100 to receive broadcast signals transmitted by the BT.

Global Positioning System (GPS) satellites 300 facilitate locating the position of at least one of plural mobile terminals 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

The display unit 151 will be again described. In the present disclosure, in a state in which a front camera is activated, an image captured by the activated front camera may be displayed as a preview image on the display unit 151. Meanwhile, if a front flash mode is executed, the controller 180 controls the brightness of at least one area of the display unit 151 so that the brightness of the image captured by the front camera is changed. That is, the present disclosure presents a terminal in which the display unit 151 performs an illumination function on the front camera, and provides a new type user interface using the terminal. Hereinafter, operations implemented as the front flash mode is executed will be described in detail with reference to the accompanying drawings.

Figure 2:
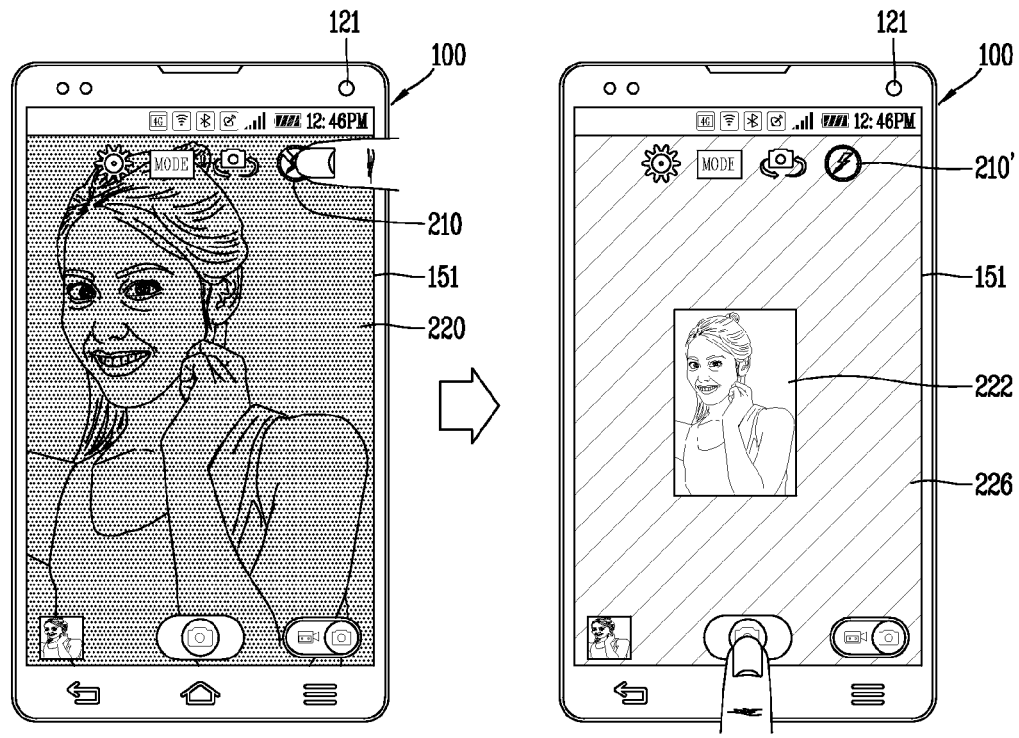
FIG. 2 is a conceptual diagram illustrating an operation implemented by the mobile terminal according to an exemplary embodiment.

FIG. 2 is a conceptual diagram illustrating an operation implemented by the mobile terminal according to an exemplary embodiment.

Referring to FIG. 2, the mobile terminal 100 has the front camera 121 and the display unit 151, disposed at the front of the terminal main body. As shown in this figure, the display unit 151 displays a preview image 220 with respect to an image captured by the front camera 121 as the front camera 121 is activated. In this state, the image captured by the front camera 121 is changed in real time, and hence the preview image 220 is changed while the front camera 121 is being activated.

Meanwhile, in addition to the preview image 220, a graphic user interface (GUI) related to the front camera 121 may be displayed on the display unit 151. For example, as shown in FIG. 2, an execution screen of an application related to photographing may be displayed on the display unit 151. At least one object formed to perform a function related to the photographing or change a setting value related to the camera may be included in the execution screen. The object may be a photographing icon, an icon for change a photographing mode, an icon for activating the front camera or a rear camera, or an icon 210 for allowing a flash mode to be activated or non-activated.

The display unit 151 may have a touch sensor for sensing a touch input so that a touch input with respect to the object can be possible. The display unit 151 may output visual information implemented in the form of an image, text, icon or the like, such as the GUI, but the visual information may be converted into a non-activated state as a predetermined time elapses or by the input of a specific control command.

Meanwhile, if a front flash mode with respect to the preview image 220 is executed, the controller 180 controls the brightness of at least one area of the display unit 151 so that the brightness of the image captured by the front camera 121 is changed.

The "front flash mode" means a mode in which the brightness of the image captured by the front camera 121 is changed by controlling the brightness of at least one area of the display unit 151 in a state in which the preview image 220 is displayed on the display unit 151. That is, the front flash mode means a mode in which the brightness of the at least one area of the display unit 151 is controlled so that the display unit 151 performs an illumination function on the front camera 121.

For example, as shown in FIG. 2, if a touch with respect to the icon 210 for allowing the flash mode for the front camera 121 to be activated or non-activated is sensed, the controller 180 execute the front flash mode.

Next, if the front flash mode is executed as shown in FIG. 2 (210→210'), the controller may control the size of the area in which the preview image is displayed (220→222), and display an image 226 of a predetermined color (e.g., white) in the other area.

As white-based light is emitted in the other area, the brightness of the at least one area of the display unit 151 is controlled, and the amount of light irradiated onto a subject positioned at the front of the front camera 121 is changed. Accordingly, the brightness of the image captured by the front camera 121 is changed.

Meanwhile, the predetermined color may be changed depending on a photographing mode (or filtering effect) of the front camera. For example, if a sepia mode is activated, a yellow-based color, rather than the white-based color, may be set as the color of the image. An image is corrected in a software manner, but the color of illumination is changed, thereby producing a more natural effect. That is, the color of a light source with respect to the front camera may be changed depending on the predetermined color.

Conventionally, there was a problem in that since any flash was not mounted at the front of the main body, photographing using a camera was impossible. However, according to the driving method described above, the display unit 151 performs an illumination function on the front camera 121 even through any flash is not provided at the front of the main body. Thus, it is possible to implement a user interface through which self-photographing is possible even in a low illumination intensity environment.

Like the flash, light of high intensity is emitted at one point. On the other hand, light of relatively low intensity is emitted using at least one area of the display unit 151, and thus it is possible to prevent a human body (particularly, eyes) from being hurt. In addition, light is emitted in an area wider than that of the flash, and thus the amount of light substantially equal to that of the flash can be irradiated onto a subject.

As such, the terminal can provide new-type front flash function through controlling of operation control of the display unit 151 in the state in which the front camera 121 is activated. In addition, the present disclosure can be used for extension of a function of another application using the front camera 121.

Figure 3:
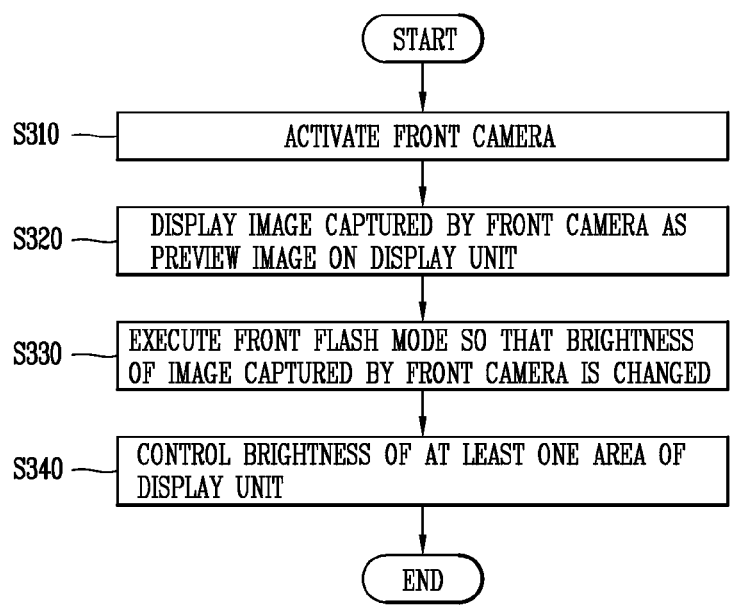
FIG. 3 is a flowchart representatively illustrating a control method of the mobile terminal according to an exemplary embodiment.

Hereinafter, a control method of the terminal performing the operation of FIG. 2 will be described in detail. FIG. 3 is a flowchart representatively illustrating a control method of the mobile terminal according to an exemplary embodiment.

First, the controller activates the front camera disposed at the front of the main body (S310).

The front camera is activated by at least one application. The application is a concept including a widget, home launcher, or the like, and means all types of programs capable of being driven in the terminal. Therefore, the application may be a program that performs unlocking using video call, picture/moving picture photographing or face recognition. That is, as the at least one application is driven, the front camera is converted into an activation state from a non-activation state.

Next, the controller displays an image captured by the front camera as a preview image on the display unit (S320).

As an application is driven, an execution screen is displayed on the display unit. The execution screen includes a preview image corresponding to the image captured by the front camera. The preview image is displayed in at least one area of the display unit, which is changed depending on the kind of the application. For example, if a photographing application is driven, the preview image may be displayed in the entire area of the display unit. If a video call application is driven, the preview image may be displayed in at least one area of the display unit.

Next, if a predetermined condition is satisfied, the controller executes a front flash mode so that the brightness of the image captured by the front camera is changed (S330). The front flash mode means a function of controlling the brightness of at least one area of the display unit so that the display unit is operated as illumination for irradiating light onto a subject.

The front flash mode may be executed in a manual or automatic manner.

In the case of the manual manner, the front flash mode may be executed when a touch input is sensed with respect to a menu or icon formed to execute the front flash mode. To this end, when an image captured by the front camera is displayed on the display unit, the controller display an icon (hereinafter, referred to as a 'flash icon') formed to execute the front flash mode together with the displayed image.

In the case of the automatic manner, if at least one of a plurality of predetermined conditions stored in the memory is satisfied, the controller may automatically execute the front flash mode. As an example, any one of the plurality of predetermined conditions may be a case where the front camera is activated. As another example, any one of the plurality of predetermined conditions may be a case where an illumination intensity value measured by an illumination intensity sensor mounted at the front of the main body is lower than a reference value. That is, when the amount of light incident in the activated front camera is less than a reference amount of light in the state in which the front camera is activated, the front flash mode is automatically executed.

Further, when the front flash mode is executed, the controller may output notification information for notifying that the front flash mode is executed, using at least on of visual, tactile and auditory manners.

Next, the controller controls the brightness of at least one area of the display unit, in response to the execution of the front flash mode.

If the front flash mode is executed, the controller performs control so that the display unit is operated as an illumination device for emitting light onto a subject. To this end, the controller controls the brightness of at least one area of the display unit. In this state, the controller controls the brightness of at least one area of the display unit so that photographing through the front camera is possible, and emits light with an amount of a predetermined level or more.

According to a first embodiment for controlling the brightness of at least one area of the display unit, the controller divides the display unit into first and second areas. A preview image corresponding to the image captured by the front camera is displayed in the first area, and an image of a predetermined color is displayed in the second area. In this state, the predetermined color is a bright white-based color, and hence the brightness of the second area increases as the size of the second area increases.

According to a second embodiment, the controller controls the amount of light emitted from a light emitting unit (or backlight) disposed at the rear of the display unit, the light emitting unit emitting light in the front direction of the main body. In this state, the controller controls the transparency of a preview image displayed on the display unit so that light generated in the light emitting unit is directly projected onto a subject.

According to a third embodiment, if a photographing command for a preview image is received, the controller does not display the preview image but displays an image of a predetermined color in the entire area of the display unit, and performs photographing in the state in which the image is displayed. If the photographing command is received, the image of the predetermined color is displayed, and hence there occurs an effect as if a flash emitted light. In this state, the controller may gradually change at least one of the size of the area in which the preview image is displayed and the transparency of the preview image in order to exactly guide a photographing time point. If the preview image disappears, and the image of the predetermined color is displayed, a photographing function is executed. Thus, a user can exactly recognize the photographing time point.

The controller may control the brightness of at least one area of the display unit by combining at least two of the first to third embodiments. Hereinafter, a method using the first embodiment will be mainly described, but the present disclosure is not limited thereto.

Meanwhile, if the front flash mode is executed, the controller calculates an amount of light incident in the front camera, using the illumination intensity sensor or the like. The controller controls the brightness of at least one area of the display unit so that the calculated amount of the light reach the reference amount of light. That is, the size of the area of the image of the predetermined color is displayed, the transparency of the preview image, or the amount of light emitted from the light emitting unit may be changed depending on the measured amount of the light.

At least one area of the display unit, of which brightness is controlled, and the brightness of the at least one area may be changed depending on a user input. The mobile terminal according to the present disclosure may provides a GUI formed to control the brightness of the at least one area when the front flash mode is executed.

The control method according to the present disclosure described above may be embodied in various forms as shown in FIGS. 4 to 10. Hereinafter, in exemplary embodiments described below, components identical or similar to those of the aforementioned exemplary embodiment are designated by identical or similar reference numerals, and their descriptions will be omitted.

FIGS. 4A to 4D are conceptual diagrams illustrating a state in which the brightness of at least one area of a display unit is controlled through execution of the front flash mode as an example of an operation implemented by the control method of FIG. 3.

Figure 4A:
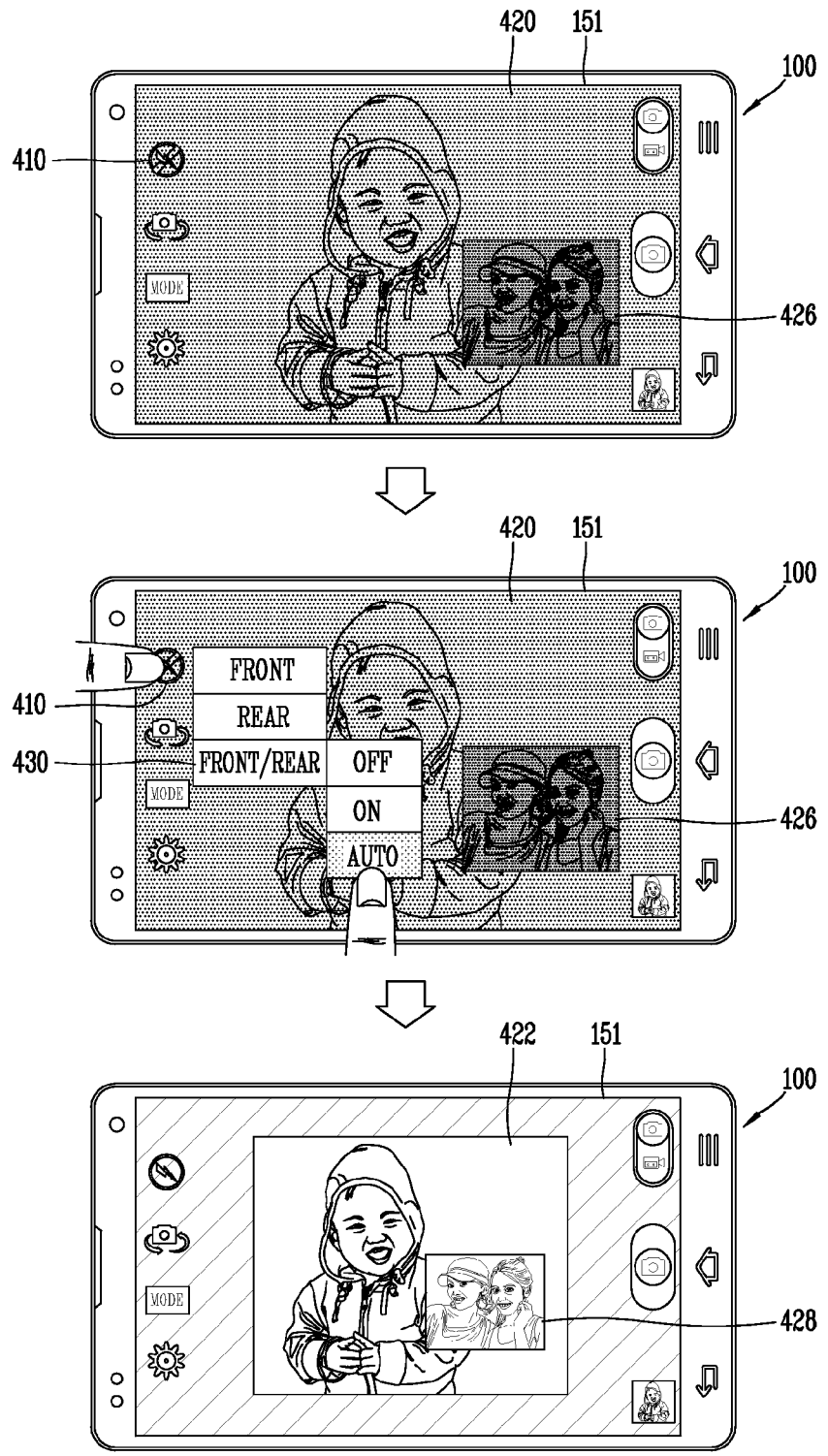
FIGS. 4A to 4D are conceptual diagrams illustrating a state in which the brightness of at least one area of a display unit is controlled through execution of a front flash mode as an example of an operation implemented by the control method of FIG. 3.

As an example of the control, referring to FIG. 4A, the front and rear cameras are simultaneously activated, so that the front flash mode can be executed in a state in which front and rear images are simultaneously displayed.

More specifically, referring to FIG. 4A, a rear image 420 captured by the rear camera and a front image 426 captured by the front camera are displayed as preview images on the display unit.

In this state, a flash icon 410 capable of changing a flash setting is displayed at one point of the display unit. If a touch input is sensed with respect to the flash icon 410, the controller may display a menu 430 related to the flash mode. The user may execute the flash mode with respect to at least one of the front and rear images, using the menu.

Meanwhile, setting for the flash mode with respect to the front and rear image may be set to 'auto'. In this case, the controller determines whether the front flash mode is activated using the amount of light incident in the front camera and whether a rear flash mode is activated using the amount of light incident in the rear camera.

If the rear flash mode is executed, the controller activates a rear flash mounted at the rear of the main body. If the front flash mode is activated, the controller controls the brightness of at least one area of the display unit.

More specifically, if the front flash mode is executed, the controller divides the entire area of the display unit into first and second areas. The preview images including the front and rear images are reduced based on the size of the first area, and the reduced preview images are displayed in the first area. An image of a predetermined color is displayed in the second area.

Meanwhile, when both the front and rear flash modes are activated, as shown in FIG. 4A, the brightness of the rear image is increased by the activated rear flash (420→422), and the brightness of the front image is increased as the image of the predetermined color is displayed in at least one area of the display unit (426→428).

As such, illumination can be applied to different subjects positioned at the front and rear of the main body, so that the user can use a dual photographing function using the front and rear cameras even at low illumination intensity.

Figure 4B:
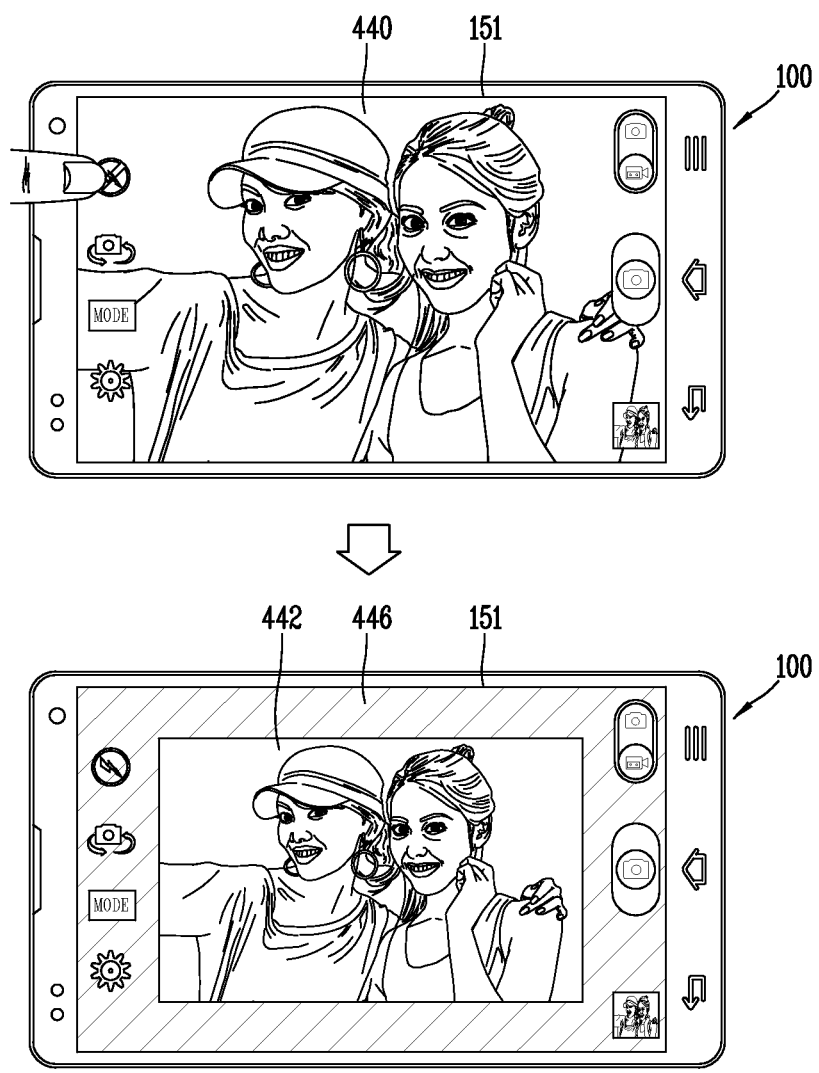

As another example of the control, referring to FIG. 4B, as an application related to picture or moving picture photographing is executed, a preview image 440 captured by the front camera may be displayed on the display unit. When only a front image is included in the preview image, a flash icon formed to execute the front flash mode is displayed on the display unit.

More specifically, if a touch input is sensed as shown in FIG. 4B in the state in which the flash icon is displayed, the front flash mode is executed.

If the front flash mode is executed, the size of an area in which the preview image is displayed is reduced, and an image of a predetermined color is displayed in the other area. That is, the preview image is displayed in a first area in the entire area of the display unit, and the image of the predetermined color is displayed in a second area different from the first area. Accordingly, the brightness of at least one area of the display unit is controlled.

Although not shown in these figures, when a photographing command is received by applying a touch to a photographing icon or the like, the controller performs photographing in a state in which the brightness of at least one area of the display unit is controlled. The preview image is displayed by being reduced as small as the size of the first area, but the resolution and size of an actually photographed image are determined by a predetermined setting.

Figure 4C:
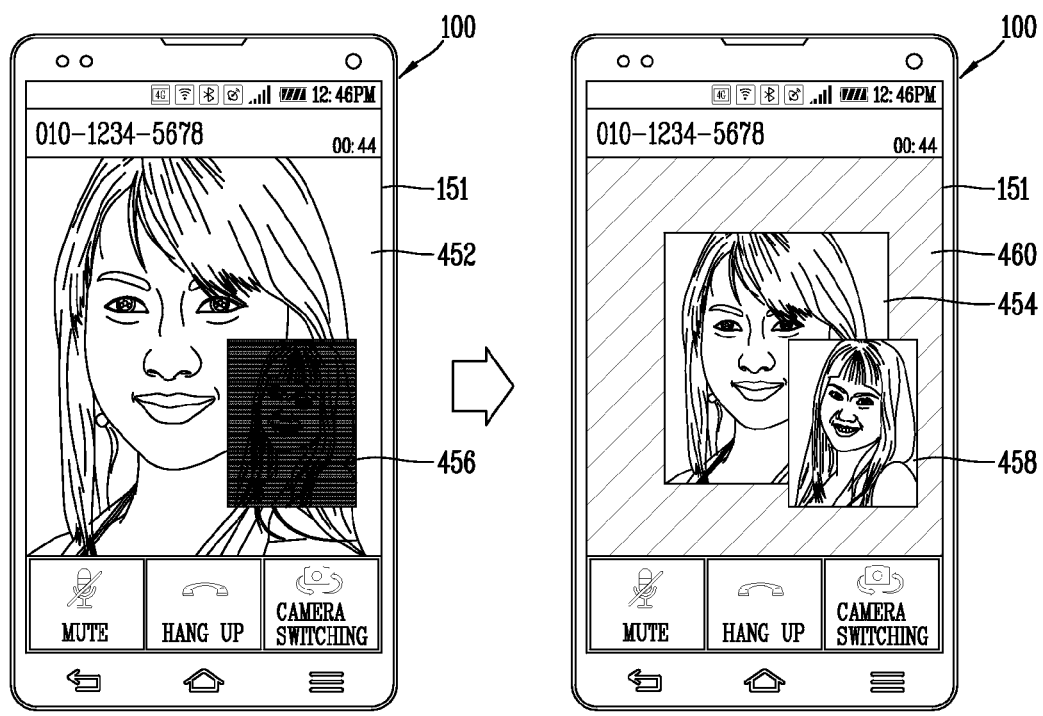

As still another example of the control, referring to FIG. 4C, an application related to a video call is executed, and an image captured by the front camera may be included on an execution screen. In this state, when a predetermined condition is satisfied, the controller executes the front flash mode.

If the front flash mode is executed, the controller may distinguish an object that is necessarily included in the execution screen from the other object that is not included in the execution screen. The controller may reduce an area in which the other object is displayed, or display an image of a predetermined color in the area in which the other object is displayed.

For example, if an application related to a video call is executed as shown in FIG. 4C, at least one of a video image 452 received by the wireless communication unit and an image 456 captured by the front camera may be displayed on the display unit 151. If the front flash mode is executed in a state in which the image 456 captured by the front camera is displayed, the controller reduce the size of an area in which the video image is displayed (452→454), and an image of a predetermined color is displayed in an area 460 remaining by reducing the size of an area in which the video image is displayed. In this state, the size of the area 460 in which the video image is displayed may be changed depending on the amount of light incident in the front camera. Accordingly, the brightness of the image captured by the front camera is changed (456→458).

Meanwhile, if a condition in which the state is set is satisfied, the controller may execute a locking state for limiting the input of a user's control command with respect to applications. In the mobile terminal configured with a display unit in which a touch can be input to the front, the sensing of a touch with respect to the display unit may be limited in order to prevent the touch from being sensed with respect to the display unit. In this case, the state in which the sensing of the touch with respect to the display unit is sensed may be defined as a locking state.

In the locking state, the reception of a user's control command with respect to the mobile terminal may be limited. For example, in the locking state, it may be limited to receive various control commands related to the performance of an operation executable in the mobile terminal, such as a touch command, a voice command and a gesture command, which are user's control commands.

If the locking mode (or locking state) is executed, the controller displays a locking screen formed to input a password when the display unit is activated. The controller may control the locking screen displayed in the locking state, based on a touch input sensed through the display unit in the locking state.

The controller may convert the locking state into an unlocking state, based on a user's request for releasing the locking state of the mobile terminal. For example, the user's request for releasing the locking state may be made by various manners including a touch command, fingerprint recognition, face recognition, a gesture command, and the like.

When the request for releasing the locking state is made by the face recognition, an image captured by the activated front camera may be displayed on the display unit. If a predetermined condition is satisfied in this state, the front flash mode is executed, and the brightness of at least one area of the display unit is controlled.

Figure 4D:
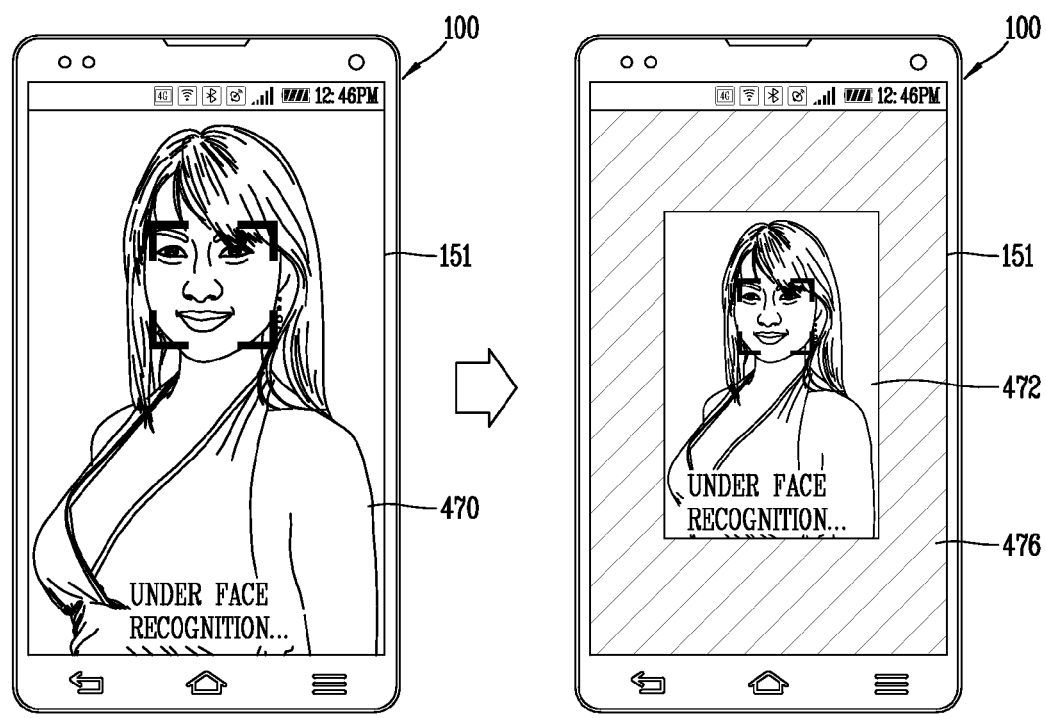

More specifically, as shown in FIG. 4D, a face recognition function may be executed in a state in which a preview image 470 captured by the front camera is displayed on the display unit 151. Meanwhile, when the amount of light incident in the front camera is less than the reference amount of light, the controller executes the front flash mode, and divides the display unit 151 into first and second areas. Since the brightness of at least one area of the display unit is controlled, the success rate of face recognition can be increased.

FIGS. 5A to 5F are conceptual diagrams illustrating a method for controlling the brightness of at least one area of a display unit through execution of a front flash mode as an example of an operation implemented by the control method of FIG. 3.

In the mobile terminal according to the present disclosure, if a predetermined condition is satisfied, the front flash mode may be executed so that the display unit is operated as illumination of the front camera. As such, when the front flash mode is executed, the controller can control the brightness of at least one area of the display unit.

Figure 5A:
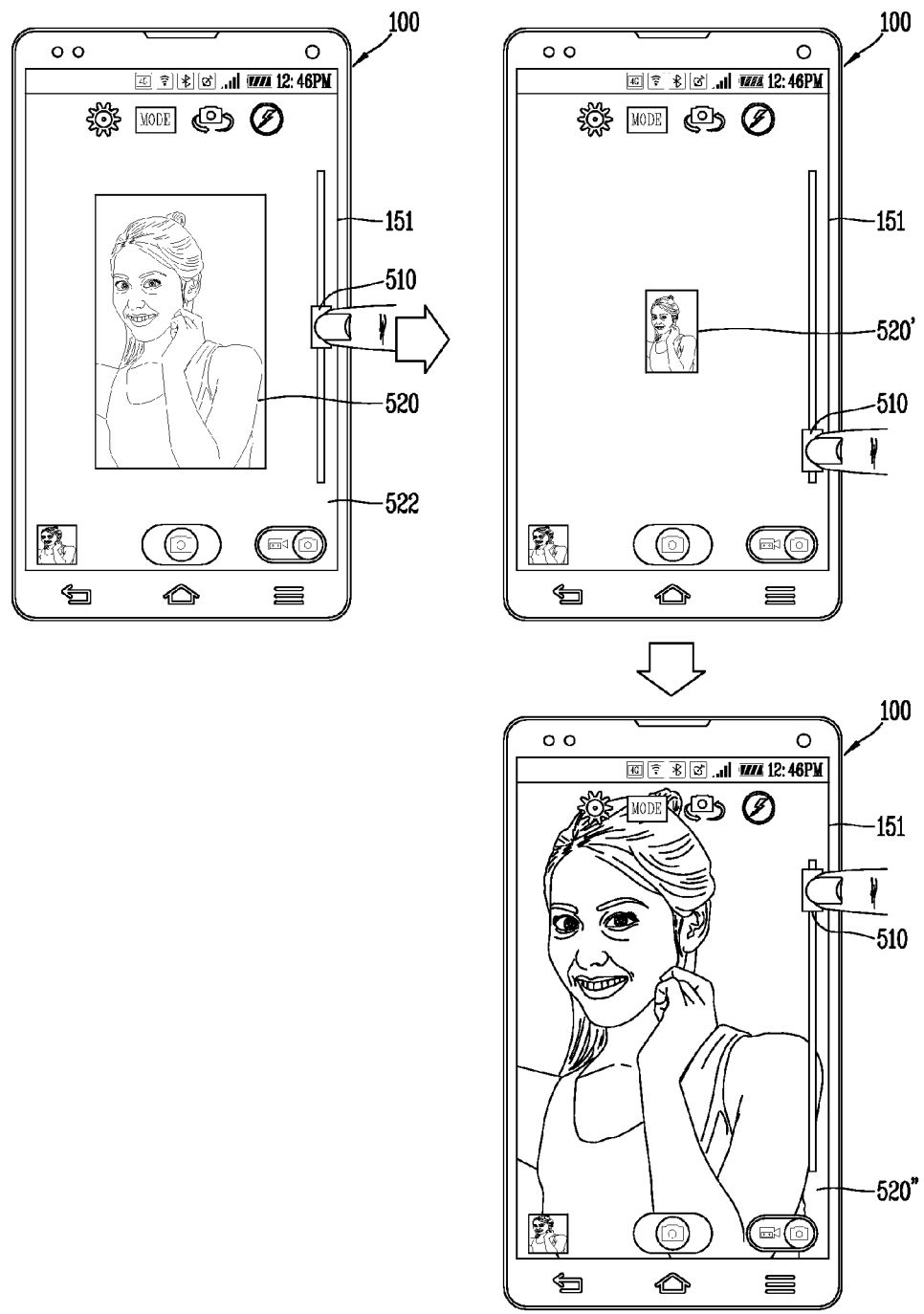
FIGS. 5A to 5F are conceptual diagrams illustrating a method for controlling the brightness of at least one area of a display unit through execution of a front flash mode as an example of an operation implemented by the control method of FIG. 3.

The method for controlling the brightness of at least one area of the display unit may be varied. As an example, as shown in FIG. 5A, the controller may divide the entire area of the display unit 151 into first and second areas. A preview image 520 captured by the front camera may be displayed in the first area, and an image of a predetermined color may be displayed in the second area.

Meanwhile, the image of the predetermined color is displayed in the second area in which the preview image is not displayed. Since an image of a bright white-based color is displayed in at least one area of the display unit, a larger amount of light can be ensured as compared with that when the preview image is displayed.

Meanwhile, the controller may measure an amount of light incident in the front camera using the illumination intensity sensor or the like, and control the sizes of the first and second areas so that a larger amount of light is incident in the front camera than the reference amount of light, based on the measured amount of light. As the illumination intensity is lowered, the size of the first area is decreased, and the size of the second area is increased, thereby ensuring a larger amount of light. In addition, an image of any one color corresponding to the measured amount of light among a plurality of predetermined colors may be displayed in the second area. That is, the color of an image displayed in the second area may be changed depending on the measured amount of light.

Meanwhile, if the front flash mode is executed or if a long touch is sensed on the preview image, the controller may display a bar for indicating the size of the first area. The controller may display a graphic object 510 formed to control the size of the first area at a point corresponding to the size of the first area in the bar.

If the user applies a drag input to the graphic object, the controller changes the size of the first area based on the drag input as shown in FIG. 5A. A preview image of which size is gradually changed along the path of the drag input is displayed in the first area. In this state, the graphic object may also be moved together with the drag input.

According to the driving method described above, the brightness of the display unit can be controlled in a simple manner, thereby implementing a simple user interface.

Figure 5B:
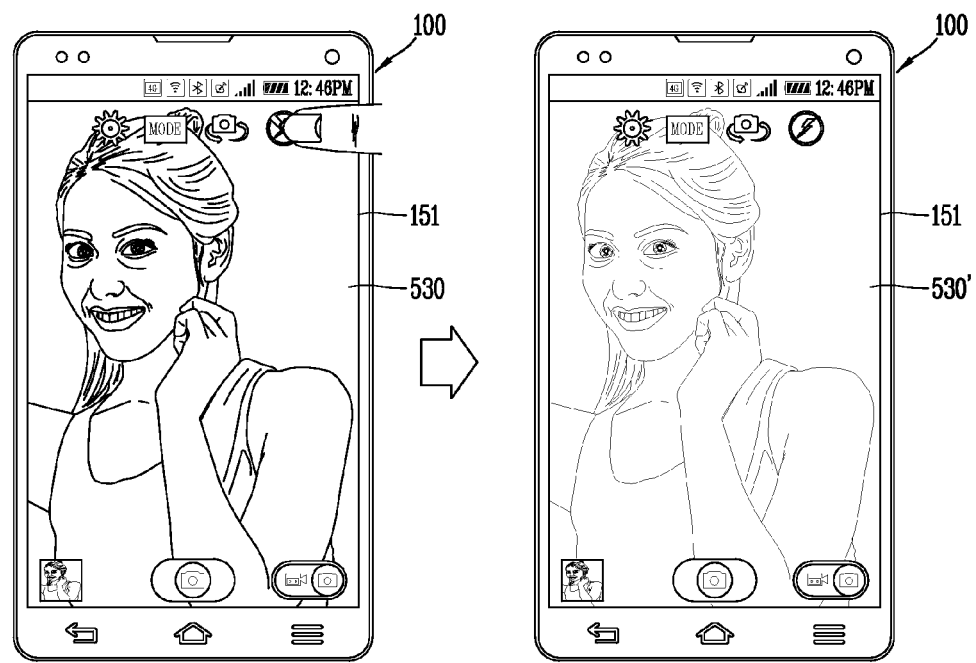

As another example, if the front flash mode is executed as shown in FIG. 5B, the transparency of the preview image displayed in the entire area of the display unit is controlled, thereby controlling the brightness of at least one area of the display unit (530→530'). In this state, the controller displays the image of the predetermined color and the preview image of which transparency is controlled to be overlapped with each other, thereby ensuring a larger amount of light.

Figure 5C:
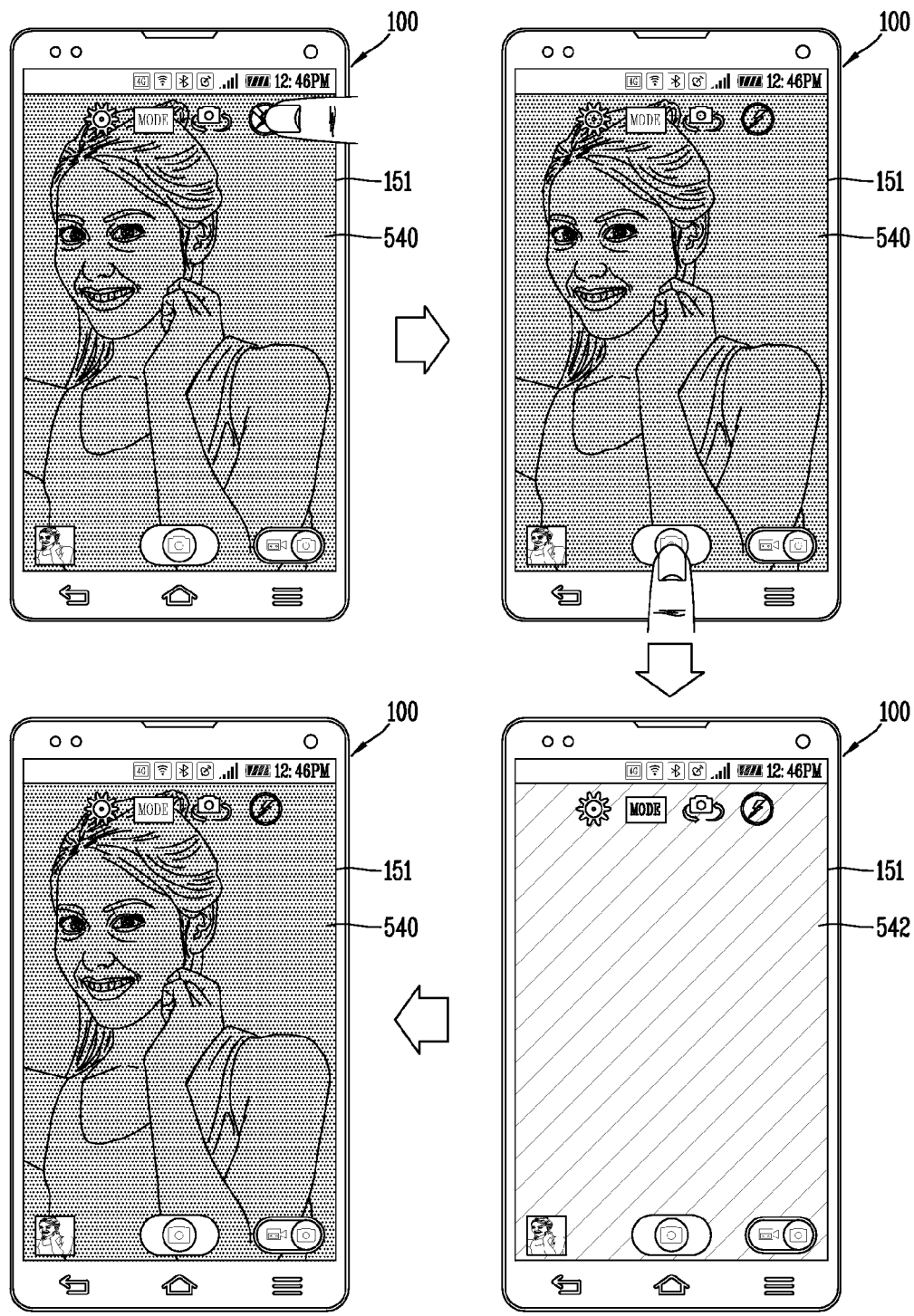

In the mobile terminal according to the present disclosure, when a predetermined condition is satisfied while a preview image 540 captured by the front camera is being displayed, the front flash mode may be executed as shown in FIG. 5C. Subsequently, if a photographing command is received, the controller displays an image 542 of a predetermined color, instead of the preview image 540, and performs photographing in the state in which the image 542 is displayed. If the photographing is completed, screen information that has been output before the image 542 is displayed may be again output. That is, the preview image 540 captured by the front camera may be again displayed. Since the screen information displayed on the display unit 151 is instantaneously changed only when the photographing is performed, a dazzling phenomenon caused by the photographing can be minimized.

As still another example, if the front flash mode is executed, the controller may search a human body including a person's face in a preview image captured by the front camera, and display, on the display unit, only guidance information representing the contour of the human body. Since an image of a predetermined color is displayed in the entire area of the display unit, a large amount of light can be ensured. In addition, since the guidance information representing the contour of the human body is displayed along the movement of the human body, the user can photograph a picture of desired composition using the guidance information.

Figure 5D:
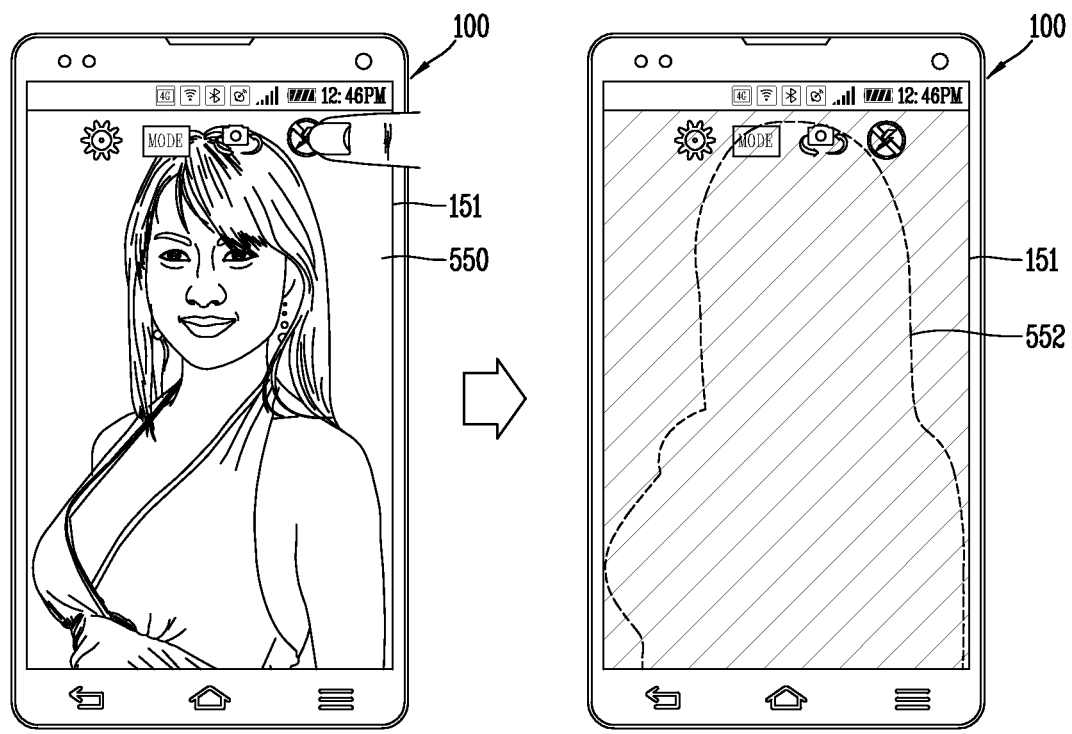

For example, when the front flash mode is executed as shown in FIG. 5D, an image of a predetermined color may be displayed instead of a preview image 550, and guide information 552 representing the contour of the human body may be displayed on the image. The guide information 552 may be changed in real time along the movement of the human body.

Although not shown in these figures, the controller may recognize a person's face included in a preview image, and measure a distance between the main body and the face from the ratio at which the recognized face occupies in the entire area of the preview image. Alternatively, the controller may measure a distance between the main body and a person positioned in the front direction of the main body using a proximity sensor.

Meanwhile, the controller may control the size and position of at least one area of the display unit and the brightness of the one area, based on the measured distance. For example, if the measured distance is a first distance, the controller may control the preview image to have a first transparency corresponding to the first distance. If the measured distance is a distance longer than the first distance, the controller may further increase the transparency of the preview image than the first transparency in order to increase the amount of light.

If a photographing command with respect to the preview image is received in the state in which front flash mode is executed, the controller may gradually change at least one of the size of an area in which the preview image is displayed and the transparency of the preview image. The controller may display an image of a predetermined color, instead of the preview image, and perform photographing in the state in which the image is displayed.

Figure 5E:
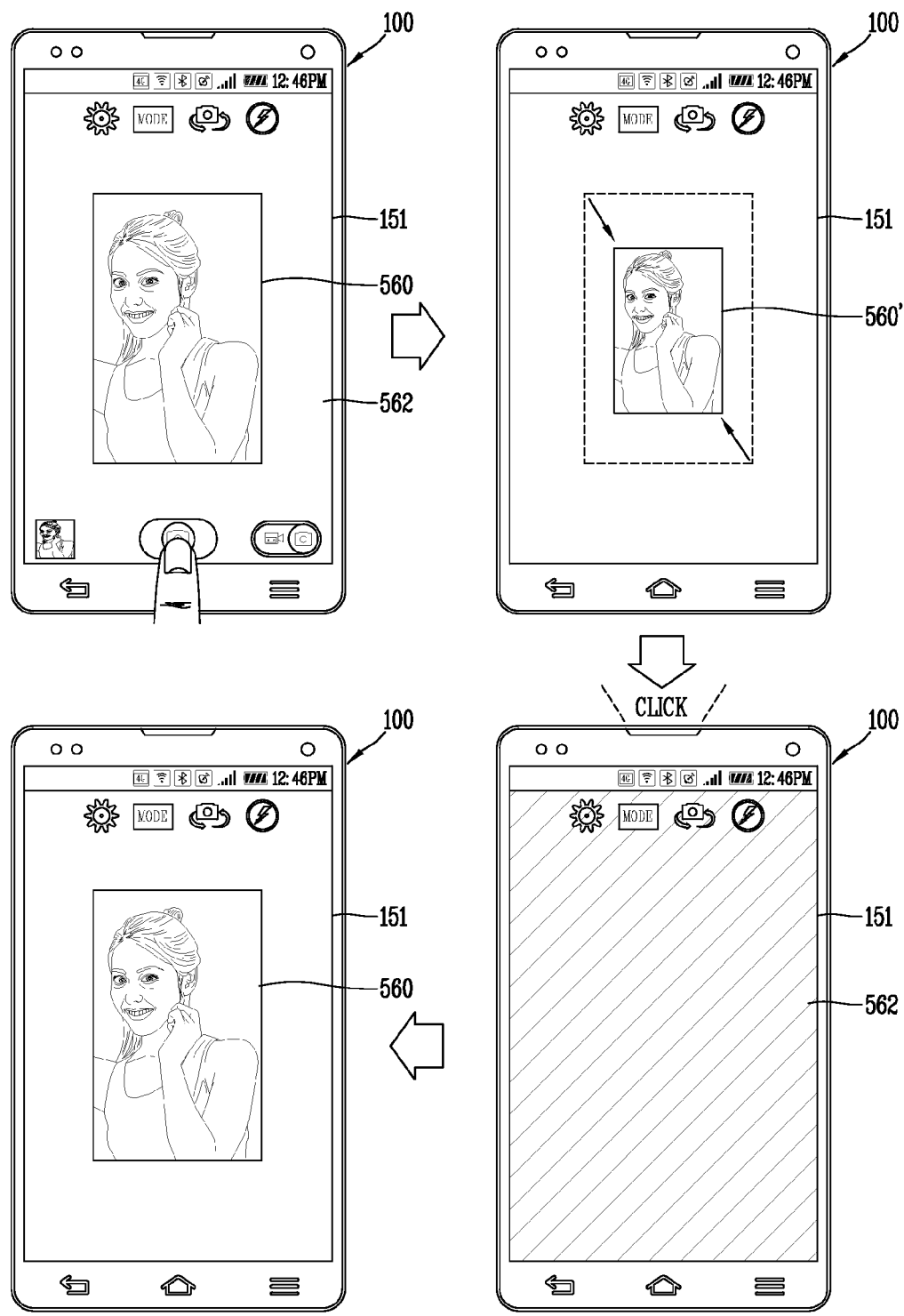
Figure 5F:
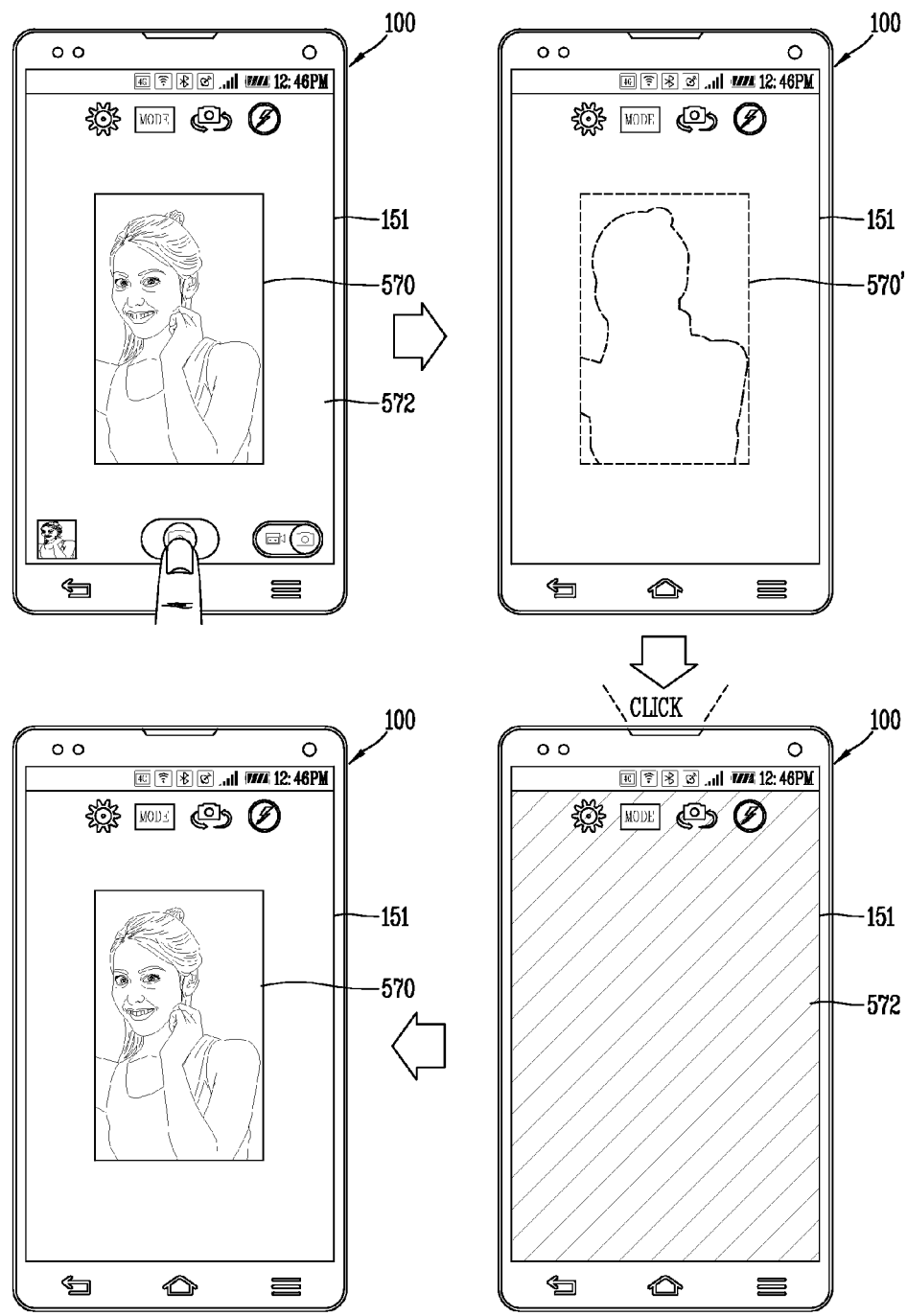

As an example, when the photographing command is received in the state in which the front flash mode is executed as shown in FIG. 5E, the controller gradually changes the size of the area in which the preview image is displayed (560→560'). That is, information is provided in a form where the preview image disappears on the display unit 151 as time elapses. More specifically, an animation effect that a preview image disappears out of a screen of the display unit may be provided to the preview image. Subsequently, if the preview image disappears in the entire area of the display unit, and an image of a predetermined color is displayed, photographing is executed. If the photographing is finished, the display unit returns to the state before the photographing command is received.

As another example, as shown in 5F, the controller may gradually change the transparency of the preview image (570→570').

As described above, in the mobile terminal according to the present disclosure, the brightness of at least one area of the display unit is controlled in various methods, thereby providing a new-type GUI.

Figure 6A:
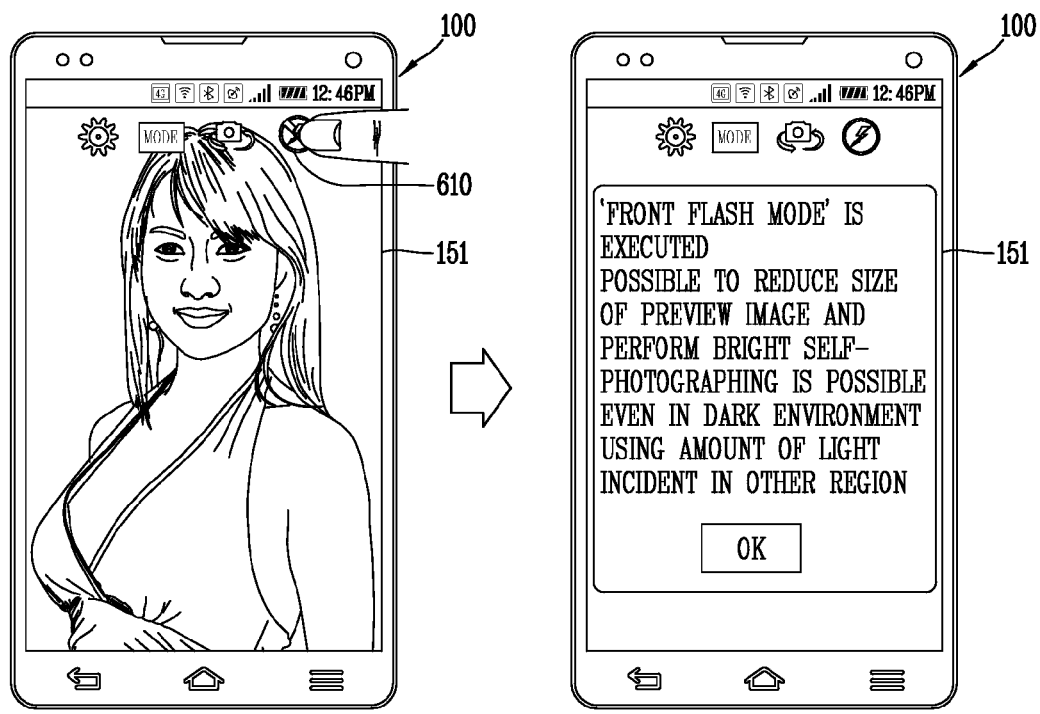
FIGS. 6A and 6B are conceptual diagrams illustrating a method for executing the front flash mode in the mobile terminal according to an exemplary embodiment.
Figure 6B:
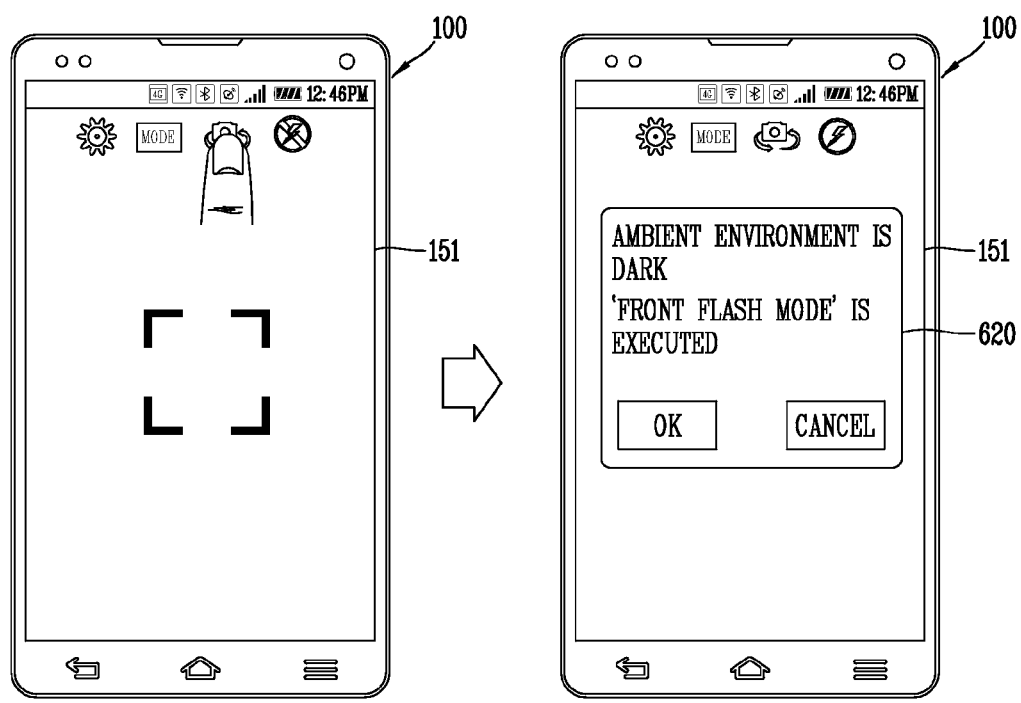

FIGS. 6A and 6B are conceptual diagrams illustrating a method for executing the front flash mode in the mobile terminal according to the exemplary embodiment.

If the front camera is activated so that an image captured by the front camera is displayed on the display unit, a flash icon 610 formed to execute the front flash mode is displayed on the display unit as shown in FIG. 6A. The front flash mode may be executed, or the execution of the front flash mode may be stopped, based on a touch input applied to the flash icon 610. That is, the front flash mode may be on or off by a user input.

Meanwhile, the controller may output notification information (or guidance information) for notifying that the front flash mode is executed, using at least one of visual, tactile and auditory manners, while executing the front flash mode.

The notification information may be information for the size and position of an image in which a preview image is displayed, or information for guiding a predetermined color of an image displayed to ensure the amount of light.

When the front camera is activated, and an image captured by the activated front camera is displayed on the display unit, the controller may calculate an amount of light incident in the front camera using the illumination intensity sensor, and execute the front flash mode based on the calculated amount of light. For example, when the calculated amount of light is less than a reference amount of light, the controller may automatically execute the front flash mode.

Meanwhile, information on the reference amount of light is stored in the memory by a terminal manufacturer when the mobile terminal is released, and may be variously modified depending on exemplary embodiments. The user may change the reference amount of light, stored in the memory, into another value.

When the front flash mode is automatically executed, a pop-up window 620 for asking the user whether the front flash mode is executed may be displayed on the display unit 151 as shown in FIG. 6B.

As the front flash mode is executed, the guidance information is displayed, so that the controller can provide a more familiar GUI to the user.

Figure 7A:
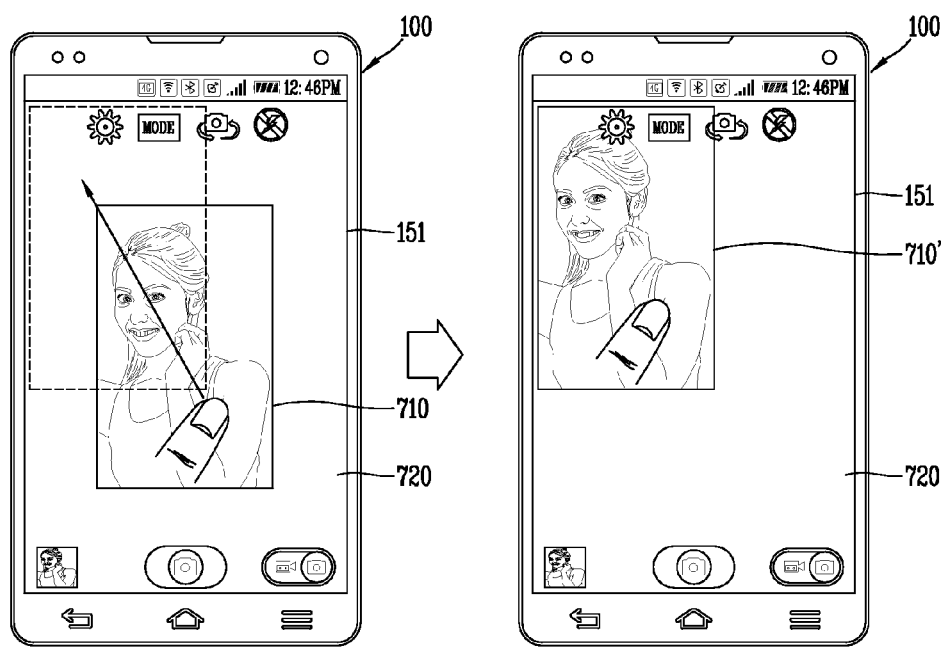
FIGS. 7A and 7B are conceptual diagrams illustrating a method for changing at least one of the size and position of a preview image in the mobile terminal according to an exemplary embodiment.
Figure 7B:
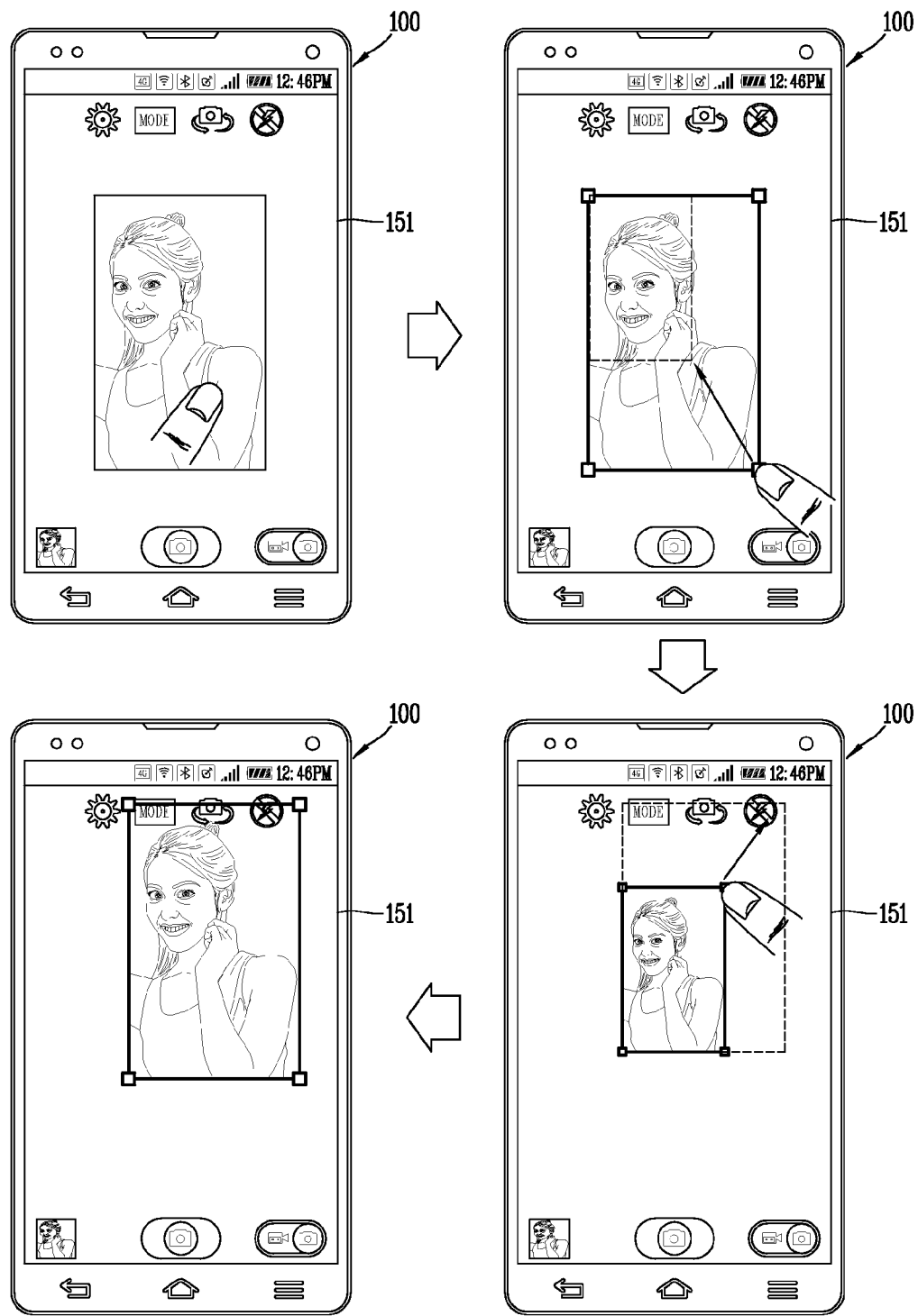

FIGS. 7A and 7B are conceptual diagrams illustrating a method for changing at least one of the size and position of a preview image in the mobile terminal according to an exemplary embodiment.

In the mobile terminal according to the present disclosure, the size and position of an area in which a preview image is displayed may be variously changed depending on an amount of light, measured by a user input or illumination intensity sensor.

Referring to FIG. 7A, as the front flash mode is executed, a preview image captured by the front camera may be displayed in a first area 710 of the display unit 151, and an image of a predetermined color may be displayed in a second area 720 different from the first area 710.

Continuously, if a drag input is applied to the preview image, the position of the first area in which the preview image is displayed may be changed depending on the drag input (710→710').

Generally, the front camera is disposed at an upper end of the terminal main body, and the user views a preview image displayed on the display unit. Hence, the sight line direction of a user's pupil in photographing does not face the camera but faces another direction. Particularly, as the physical size of the display unit increases, the probability that the sight line direction may face a wrong direction is high, and an image of user's desired composition cannot be obtained.

However, when the front flash mode is executed, the position of a first area in which the preview image is displayed can be changed by a user input, and the user can obtain an image of desired composition using the changed position of the first area. As an example, the user may move the first area to an upper end of the display unit, close to the front camera, and allow the sight line direction of the user's pupil to face the direction of the camera. As another example, the user may move the first area to a lower end of the display unit, distant from the front camera, and create composition where the sight line direction naturally faces a lower direction.

If a long touch is sensed with respect to the preview image as shown in FIG. 7B, the controller may set, as a grid cell, the first area in which the preview image is displayed, display a plurality of lines for defining the grid cell, and display a plurality nodes at intersection positions of the plurality of lines.

Continuously, the user may change the size (or layout) of the first area set as the grid cell, based on a drag input with respect to the plurality of lines and the plurality of nodes. As the size of the first area is changed, the size of the preview image displayed in the first area is also changed. Accordingly, the user can control the brightness of at least one area of the display unit.

Meanwhile, in the mobile terminal according to the present disclosure, the color of an image displayed in the other area in which a preview image is not displayed may be changed as well as the size and position of an area in which the preview image is displayed, based on a user's input. Hereinafter, a method for changing the color of an image is changed will be described in detail with reference to the accompanying drawings.

FIGS. 8A, 8B, 9A and 9B are conceptual diagrams illustrating a method for changing the color of a predetermined image in the mobile terminal according to an exemplary embodiment.

Figure 8A:
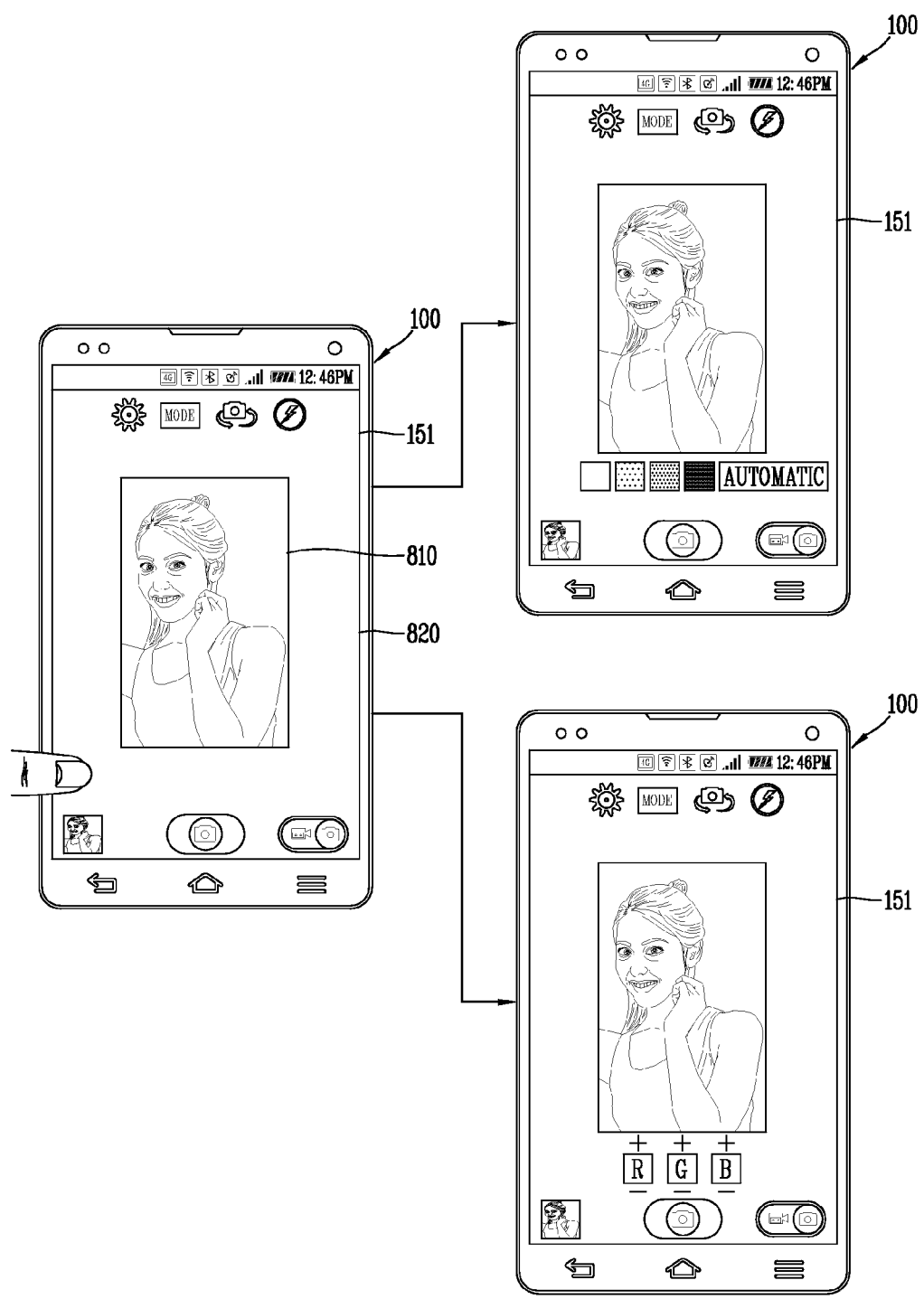
FIGS. 8A, 8B, 9A and 9B are conceptual diagrams illustrating a method for changing the color of a predetermined image in the mobile terminal according to an exemplary embodiment.

Referring to FIG. 8A, as the front flash mode is executed, a preview image captured by the front camera may be displayed in a first area 810 of the display unit 151, and an image of a predetermined color may be displayed in a second area 820 different from the first area 810.

Continuously, if a long touch is sensed in the second area 820 in the image is displayed, the controller may display a color selection menu for changing the color of the image. As an example, as shown in FIG. 8A, at least one object corresponding to different colors may be included in the color selection menu, and the colors included in the color selection menu may be aligned in an order of the colors that the user frequently selects. As another example, as shown in FIG. 8A, the color selection menu may include a menu where the user can specify red, green and blue (RGB). In addition to the methods shown in these figures, various interfaces formed to change colors may be displayed on the display unit.

Although not shown in these figures, if any one color is selected in the color selection menu, the color of the image displayed in the second area is changed using the selected color. If at least two colors are selected, the controller may mix the selected colors, and change the color of the image displayed in the second area into the mixed color.

Figure 8B:
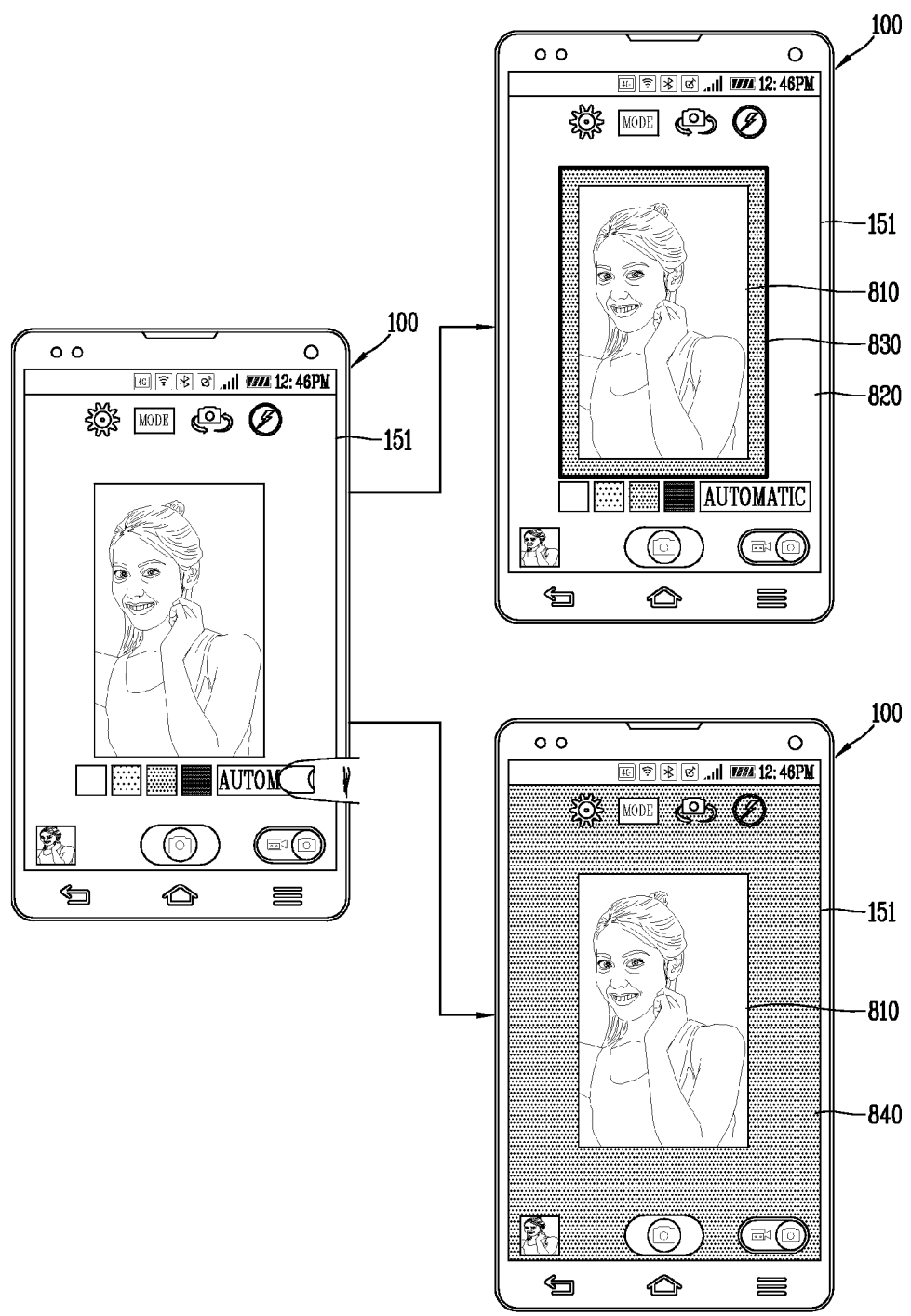

Meanwhile, in the mobile terminal according to the present disclosure, the color selection menu may include a menu for automatically selecting a color. As shown in FIG. 8B, if the menu for automatically selecting the color is selected, the controller may extract a color of the face included in the preview image, and change the color of the image displayed in the second area based on the extracted color of the face. The controller senses a color of the user's face, and search a light source color forming an appropriate color temperature with respect to the sensed color of the face, using a predetermined numerical expression.

As an example, when the light source color is searched, the controller, as shown in FIG. 8B, may display a new image 830 of the searched light source color at an edge of the preview screen 810. The existing image 820 of the predetermined color and the new image 830 are simultaneously displayed, and thus the user can select a light source color suitable therefor.

As another example, as shown in FIG. 8B, the controller may display the new image 830 of the searched light source color, instead of the existing image 820 of the predetermined color, in the second area.

Meanwhile, the second area of the predetermined color may include a plurality of areas, and images of different colors may be displayed in the plurality of areas, respectively.

Figure 9A:
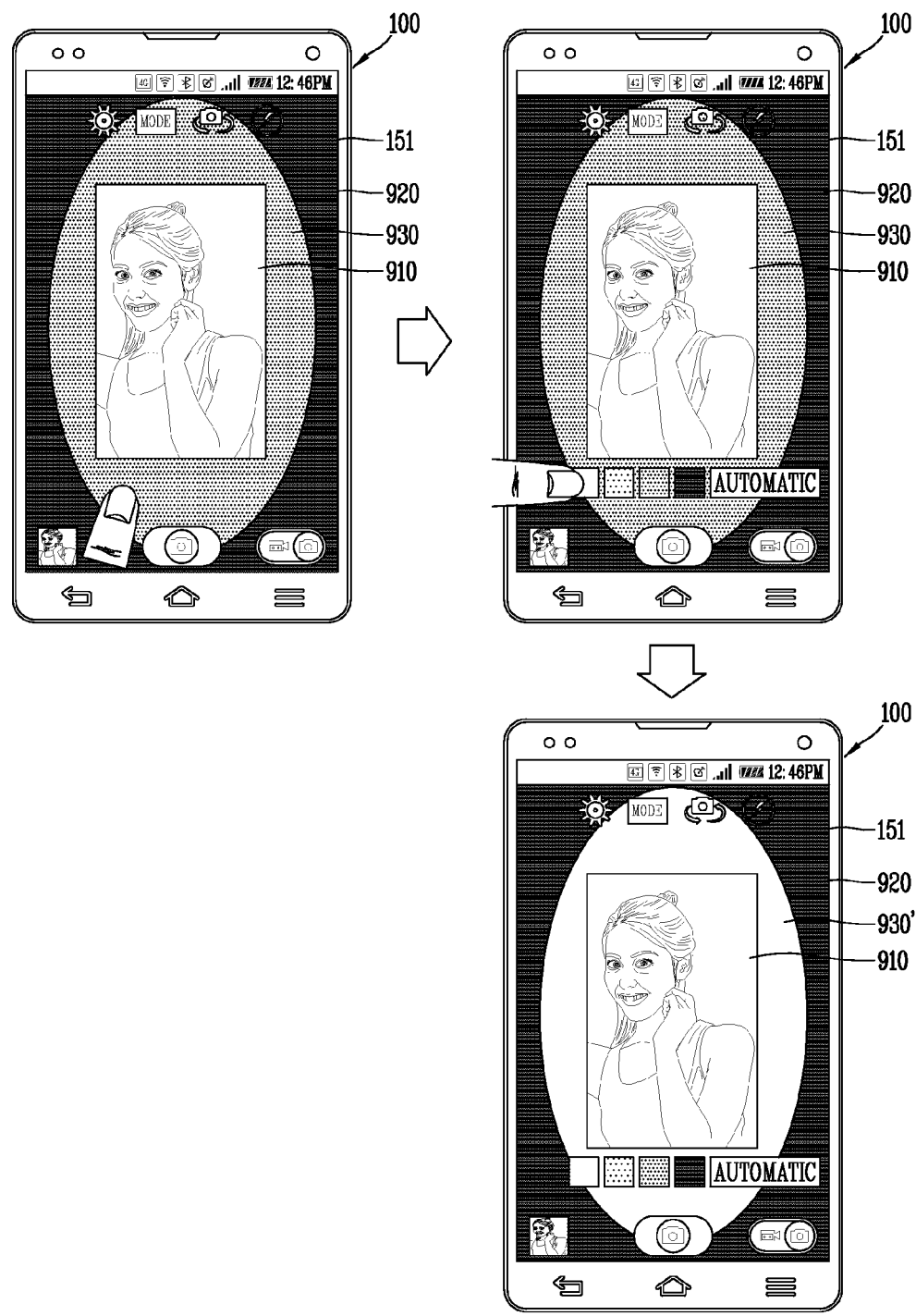

The plurality of areas may be previously set. When the plurality of areas are previously set, the controller may set the colors of images displayed in the respective area, based on a users input. For example, as shown in FIG. 9A, a preview image 910 may be displayed in a first area, and first and second images 920 and 930 may be displayed in a second area. If a long touch is applied to the second image 930, the controller, may display a color selection menu for changing the color of the second image 930. Subsequently, if at least one color is selected by the user, the controller may change the color of the second image into the selected color (930→930').

Figure 9B:
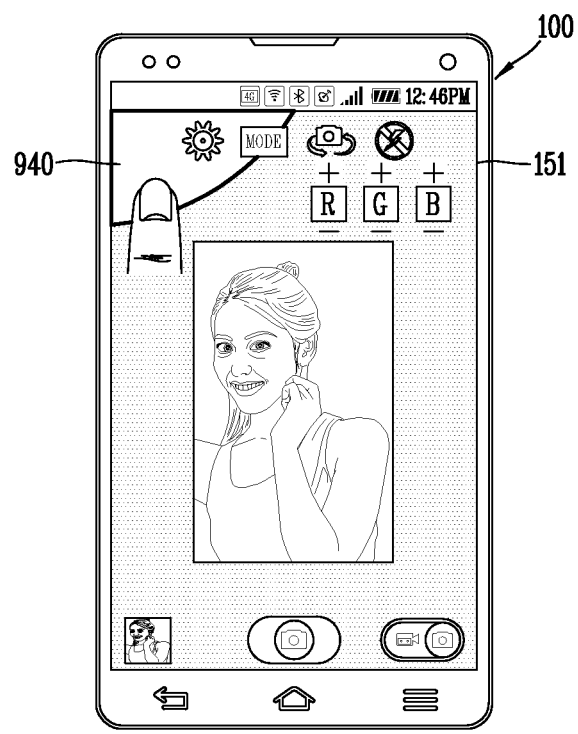

Alternatively, the plurality of areas may be set by a user input. For example, if a long touch is applied to the second area and changed into a drag input continuously moving from the point at which the long touch is applied without being released as shown in FIG. 9B, an area positioned on the path of the drag input is selected. If the drag input is released, highlighting is performed so that the area selected by the drag input is distinguished from another area, and a color selection menu for selecting a color of an image to be display in the selected area may be displayed. That is, the controller may select at least one area of the display unit based on a user input, and select a color of the image to be displayed in the selected area based on a user input.

According to the driving method described above, various illumination effects can be created using the display unit. That is, the terminal can provide a GUI for providing a new photographing technique using an illumination effect.

Figure 10:
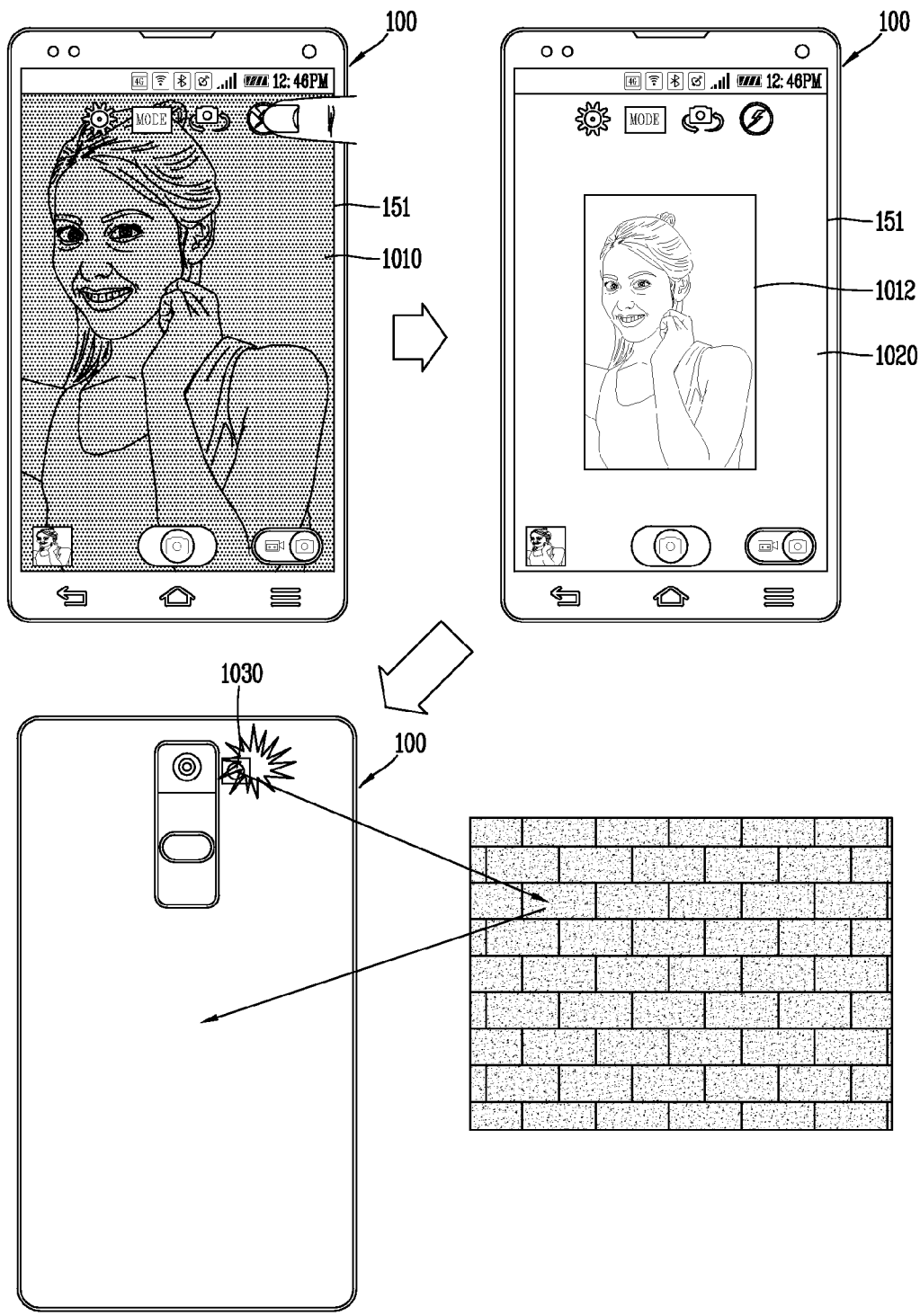
FIG. 10 is a conceptual diagram illustrating an exemplary embodiment using a rear flash in a state in which the front flash mode is executed.

FIG. 10 is a conceptual diagram illustrating an exemplary embodiment using the rear flash in a state in which the front flash mode is executed.

In the mobile terminal of the present disclosure, although the front flash mode is executed, various light sources with respect to the front camera can be created using the rear flash mounted at the rear of the main body.

More specifically, if the front flash mode is executed as shown in FIG. 10, a rear flash 1030 is activated. Light generated in the rear flash 1030 is reflected in the front direction of the main body by an object positioned in the rear direction of the main body. That is, an additional amount of light can be ensured by light reflected from a wall or the like.

Meanwhile, a proximity sensor (not shown) may be disposed at the rear of the mobile terminal to sense an object approaching a predetermined detection surface or an object existing in the neighborhood of the predetermined detection surface. The controller may activate the rear flash 1030 in the front flash mode only when an object is sensed at the rear of the main body.

The rear flash 1030 may be continuously activated in the state in which the front flash mode is executed, or be activated for a predetermined short time only when a photographing command is received in order to prevent battery consumption.

Meanwhile, although not shown in this figure, which setting related to the front flash mode the user frequently uses in a specific situation may be stored in the mobile terminal according to the present disclosure. In addition, a setting value related to the front flash mode may be automatically set using a setting stored depending on a state of the terminal. For example, the sizes of first and second areas in a specific illumination intensity, the color of an image displayed in the second area, the transparency of a preview image displayed in the first area, the amount of light emitted in the light emitting unit, and the like may be periodically updated, and relative setting values may be automatically set. In addition, if a setting value at a specific position (e.g., a user's room) is stored, and the front flash mode is executed at the specific position, the stored setting value may be automatically set. Accordingly, it is possible to provide an intelligent terminal that searches and determines an external environment for itself, thereby automatically performing a required operation.

As described above, in the present disclosure, as the brightness of at least one area of the display unit is controlled, it is possible to provide new-type user convenience of providing a light source with respect to the front camera.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. The mobile terminal comprising:
a main body;
a front camera disposed at a front side of the main body;
a display disposed at the front side of the main body; and
a controller is further configured to:
cause the display to display a preview image within a first portion of the display, wherein the preview image is obtained via the front camera; and
cause the display to display an icon for activating or deactivating a flash mode of the front camera when the preview image is displayed such that the display is controlled in different ways based on whether the flash mode is activated or deactivated when a photographing command is received, wherein while the flash mode is activated, the controller is further configured to:
  divide the first portion into a second portion and a remaining portion in response to the photographing command such that the remaining portion surrounds the second portion;
  cause the display to reduce a size of the preview image displayed within the first portion of the display in response to the photographing command;
  cause the display to display the preview image within the second portion in response to the photographing command such that the preview image displayed within the second portion is smaller than the preview image displayed within the first portion;
  cause the display to display at least one image of a predetermined color within the remaining portion in response to the photographing command, wherein the at least one image is an image that is not obtained via the front camera, and wherein at least one property of the preview image is changed when the size of the preview image is reduced and the reduced preview image is displayed within the second portion of the display due to illumination generated from the at least one image displayed within the remaining portion of the first portion; and
  perform photographing in response to the photographing command while the at least one image is displayed within the remaining portion, and
wherein while the flash mode is deactivated, the controller is further configured to perform photographing in response to the photographing command while the preview image is displayed within the first portion of the display.

2. The mobile terminal of claim 1, further comprising a sensor disposed at the front side of the main body and configured to measure an amount of light available for the front camera,
  wherein the controller is further configured to adjust sizes of the second portion and the remaining portion based on the measured amount of light such that the size of the second portion decreases and the size of the remaining portion increases when the measured amount of light is less than a threshold amount.

3. The mobile terminal of claim 1, wherein the controller is further configured to cause the display to display a graphic object for controlling a size of the second portion such that the size of the second portion is changeable based on a drag input applied to the graphic object.

4. The mobile terminal of claim 1, wherein a color of the at least one image is changeable according to a photographing mode implemented by the front camera.

5. The mobile terminal of claim 4, wherein the remaining portion of the first portion is divided into a plurality of areas and each of the plurality of areas includes an image of a different color.

6. The mobile terminal of claim 1, further comprising a sensor disposed at the front side of the main body and configured to measure an amount of light available for the front camera,
  wherein the controller is further configured to cause the display to display the at least one image within the remaining portion of the first portion when the measured amount of light is less than a reference amount while the front camera is activated.

7. The mobile terminal of claim 6, further comprising a light emitting unit disposed at a rear side of the main body and configured to emit light,
  wherein the controller is further configured to control an amount of the light emitted by the light emitting unit such that the amount of light available for the front camera becomes greater than the reference amount.

8. The mobile terminal of claim 7, wherein the controller is further configured to control transparency of the preview image such that the light emitted from the light emitting unit is directly projected onto a subject in front of the front camera.

9. The mobile terminal of claim 8, wherein:
  the at least one image is a preset-color image; and
  the controller is further configured to cause the display to display the preview image of which the transparency is controlled such that the preview image and the preset-color image overlap with each other.

10. The mobile terminal of claim 1, wherein the controller is further configured to cause the front camera to capture an image corresponding to the preview image within the second portion in response to the photographing command.

11. The mobile terminal of claim 1, wherein the controller is further configured to cause output of notification information in at least a visual, tactile, or auditory manner in response to the photographing command, wherein the notification information is for notifying the displaying of the preview image within the second portion of the display and the displaying of the second image within the remaining portion of the first portion.

12. The mobile terminal of claim 1, wherein the photographing is performed while the preview image is displayed within the second portion when the flash mode is activated.

* * * * *